(12) United States Patent
Trachtenberg et al.

(10) Patent No.: US 9,782,003 B2
(45) Date of Patent: Oct. 10, 2017

(54) ROTATING WALL MOUNT FOR DISPLAY DEVICE

(71) Applicants: Marc Trachtenberg, New York, NY (US); Francois Gariepy, Westmount (CA)

(72) Inventors: Marc Trachtenberg, New York, NY (US); Francois Gariepy, Westmount (CA)

(73) Assignee: Viden Inc., New York, NY (US)

( * ) Notice: Subject to any disclaimer, the term of this patent is extended or adjusted under 35 U.S.C. 154(b) by 170 days.

(21) Appl. No.: 14/970,097

(22) Filed: Dec. 15, 2015

(65) Prior Publication Data

US 2016/0166061 A1 Jun. 16, 2016

Related U.S. Application Data

(63) Continuation-in-part of application No. 14/213,729, filed on Mar. 14, 2014, and a continuation-in-part of
(Continued)

(51) Int. Cl.
*A47B 7/00* (2006.01)
*A47B 97/00* (2006.01)
(Continued)

(52) U.S. Cl.
CPC ......... *A47B 97/001* (2013.01); *F16M 11/105* (2013.01); *F16M 13/02* (2013.01); *H01R 35/04* (2013.01); *H04N 5/64* (2013.01)

(58) Field of Classification Search
CPC .... A47B 97/001; F16M 11/105; F16M 13/02; F16M 11/02; H01R 35/04; H04N 5/64
See application file for complete search history.

(56) References Cited

U.S. PATENT DOCUMENTS 3,908,942 A * 9/1975 Keith ................... A47B 81/065
108/48
5,941,493 A * 8/1999 Cheng .................. F16M 11/105
248/371
(Continued)

FOREIGN PATENT DOCUMENTS

WO 2005019720 A1 3/2005

OTHER PUBLICATIONS

International Search Report in PCT/US2016/066934 dated Mar. 31, 2017.
(Continued)

*Primary Examiner* — Dimary Lopez Cruz
*Assistant Examiner* — Abhishek Rathod
(74) *Attorney, Agent, or Firm* — Pryor Cashman LLP

(57) ABSTRACT

A system and method for pivotally wall-mounting a device is disclosed. The wall mount includes a power connector disc having contact pads, a wall plate mounted to the wall having at least one mounting slot and at least one tab for limiting rotation, a rotator plate configured to coaxially engage said wall plate with at least one mounting horn extending in an upward direction and a central opening and having at least one inwardly projecting rotation tab, a face plate configured to coaxially engage said rotator plate and said wall plate and fixed to the wall plate enclosing the rotator plate and having a central opening with at least one strip extending into the interior, and a back cover coupled to the device having contact points to receive said contact pads, at least one slot to receive said mounting horn and at least one flap to receive said strip.

55 Claims, 36 Drawing Sheets

Related U.S. Application Data application No. 29/469,599, filed on Oct. 11, 2013, now abandoned, and a continuation-in-part of application No. 29/469,606, filed on Oct. 11, 2013, now abandoned, and a continuation-in-part of application No. 29/469,621, filed on Oct. 11, 2013, now abandoned, and a continuation-in-part of application No. 29/469,628, filed on Oct. 11, 2013, now abandoned, and a continuation-in-part of application No. 29/469,633, filed on Oct. 11, 2013, now abandoned, and a continuation-in-part of application No. 29/469,638, filed on Oct. 11, 2013, now abandoned, and a continuation-in-part of application No. 29/469,645, filed on Oct. 11, 2013, now abandoned.

(51) Int. Cl.

| | |
|---|---|
| *F16M 13/02* | (2006.01) |
| *H01R 35/04* | (2006.01) |
| *F16M 11/10* | (2006.01) |
| *H04N 5/64* | (2006.01) |

(56) References Cited

U.S. PATENT DOCUMENTS

| | | | | |
|---|---|---|---|---|
| 6,302,617 | B1* | 10/2001 | Rumpp | B60D 1/52 285/401 |
| 6,695,274 | B1* | 2/2004 | Chiu | F16M 11/10 248/284.1 |
| 7,317,613 | B2* | 1/2008 | Quijano | F16M 11/041 16/323 |
| 7,434,774 | B1* | 10/2008 | Floersch | F16M 11/10 248/183.1 |
| 7,652,873 | B2* | 1/2010 | Lee | E05B 65/006 248/917 |
| 7,673,838 | B2* | 3/2010 | Oddsen, Jr. | F16M 11/041 248/221.11 |
| 7,748,670 | B1* | 7/2010 | Veldez | F16M 11/14 248/181.1 |
| 7,832,055 | B2* | 11/2010 | Schoolcraft | H04M 1/0227 16/330 |
| 8,083,193 | B2* | 12/2011 | Matsui | F16M 11/041 248/221.11 |
| 8,498,101 | B2* | 7/2013 | Chiang | F16M 11/105 248/121 |
| 9,027,893 | B2* | 5/2015 | Cheng | F16M 13/022 248/201 |
| 2001/0048584 | A1* | 12/2001 | Rosen | F16M 11/105 361/679.07 |
| 2003/0223185 | A1* | 12/2003 | Doczy | G06F 1/1626 361/679.11 |
| 2010/0013742 | A1 | 1/2010 | Unger | |
| 2011/0069055 | A1* | 3/2011 | Jung | H04N 5/64 345/211 |
| 2014/0339385 | A1* | 11/2014 | Boer | B60R 11/0235 248/222.52 |
| 2014/0355200 | A1* | 12/2014 | Thiers | H04W 88/02 361/679.41 |
| 2015/0068799 | A1* | 3/2015 | Lien | F16M 11/105 174/503 |
| 2015/0070594 | A1 | 3/2015 | Trachtenberg et al. | |
| 2016/0166061 | A1 | 6/2016 | Trachtenberg et al. | |

OTHER PUBLICATIONS

Written Opinion of the International Searching Authority in PCT/US2016/066934 dated Mar. 31, 2017.

* cited by examiner

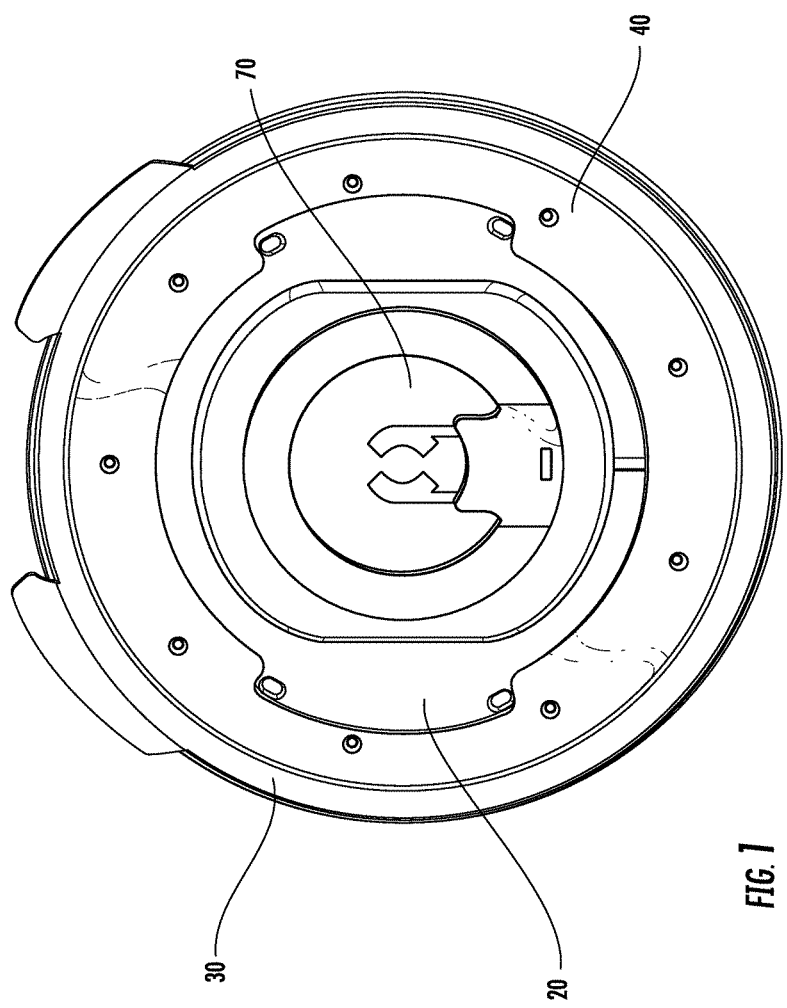

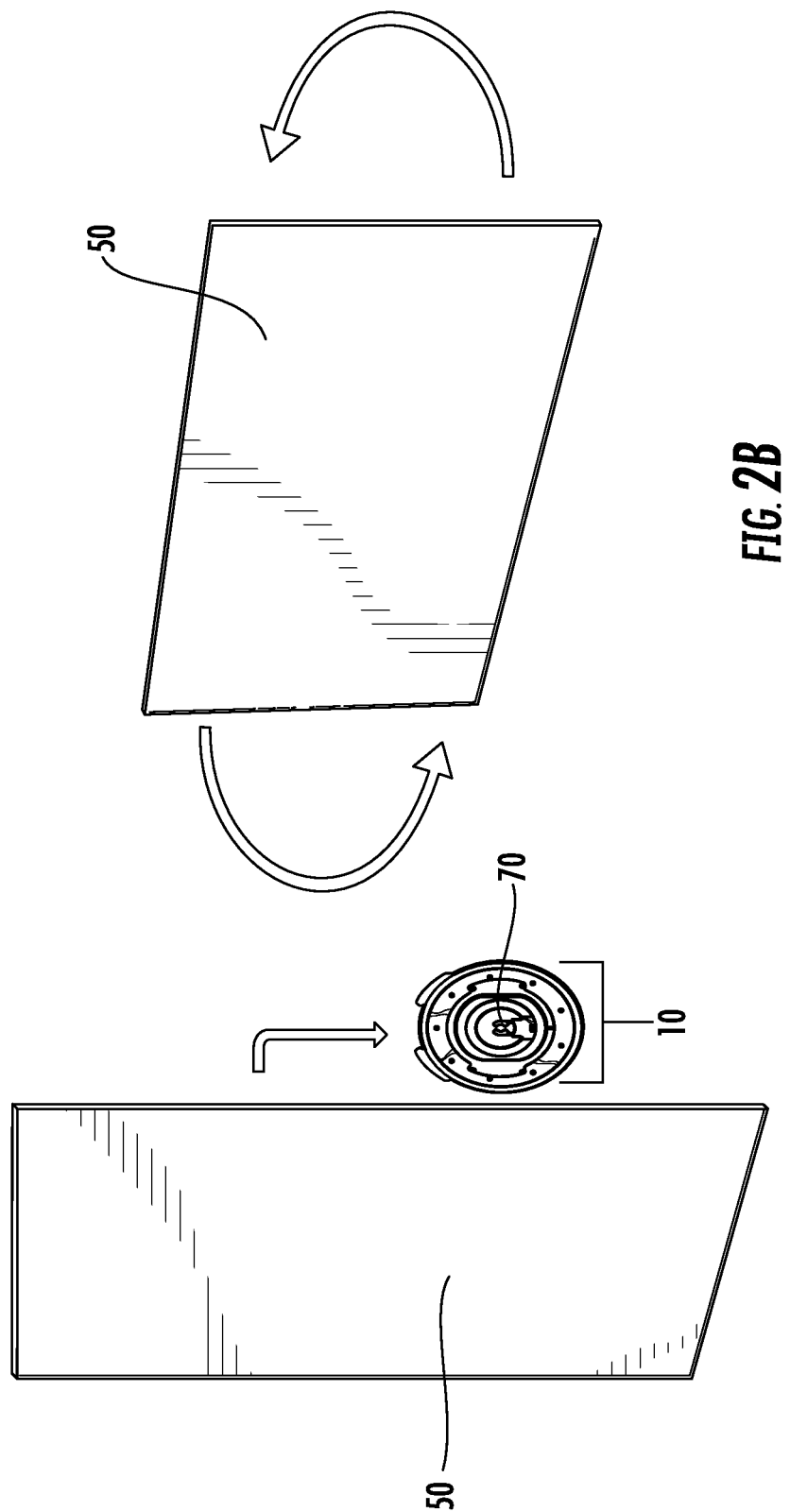

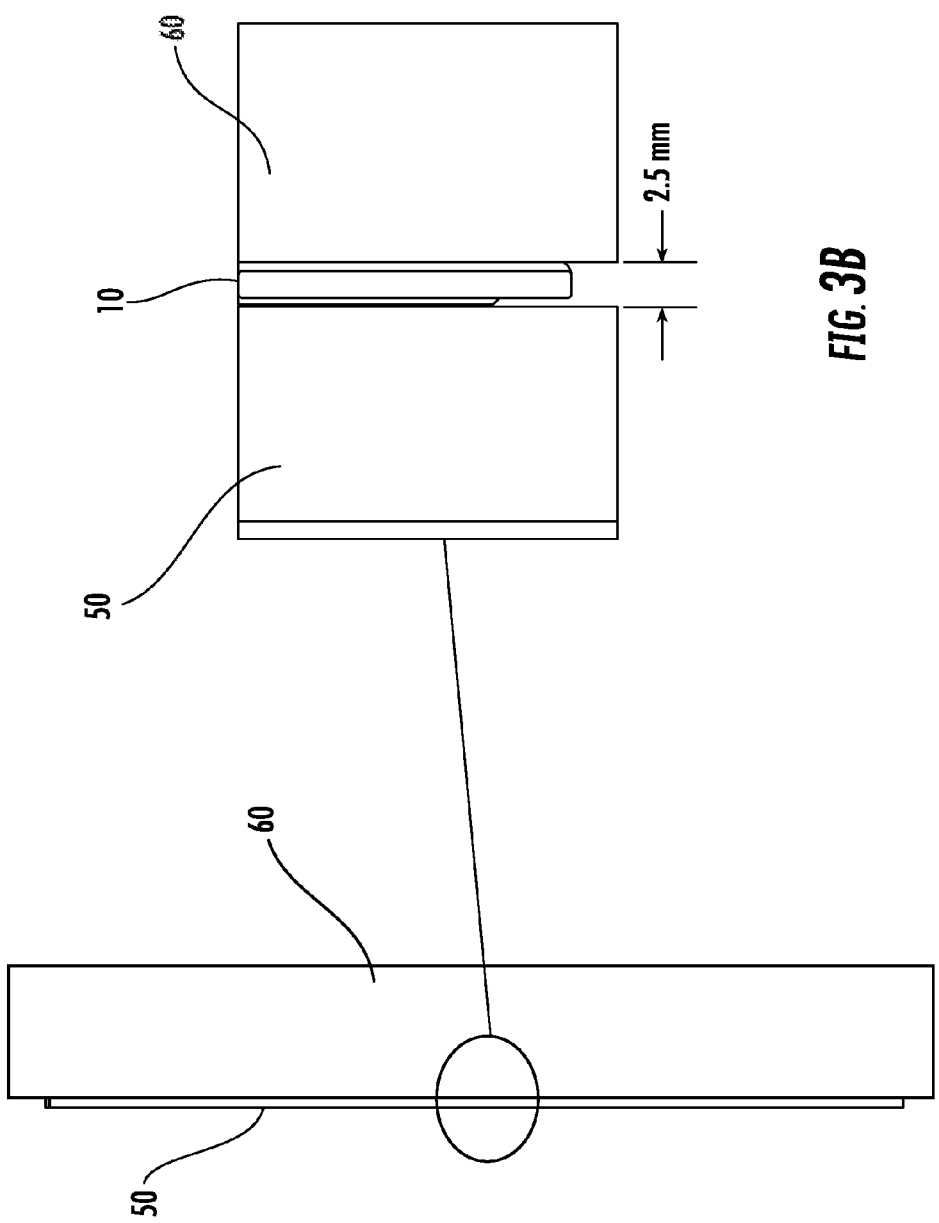

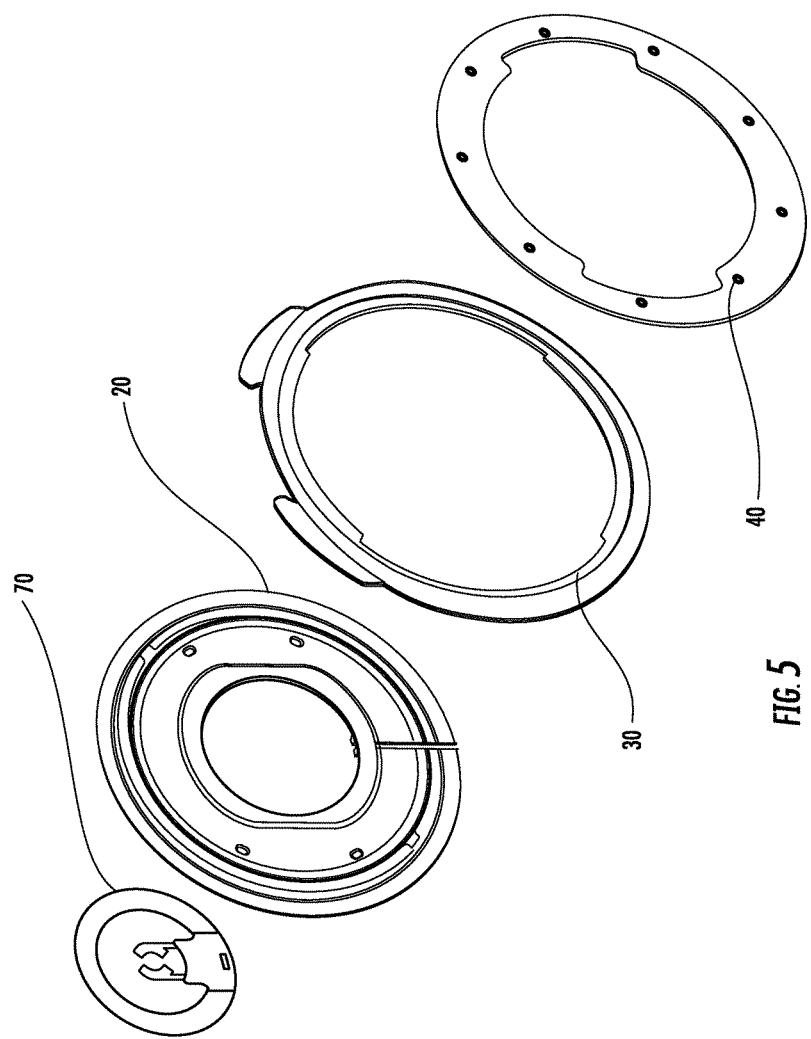

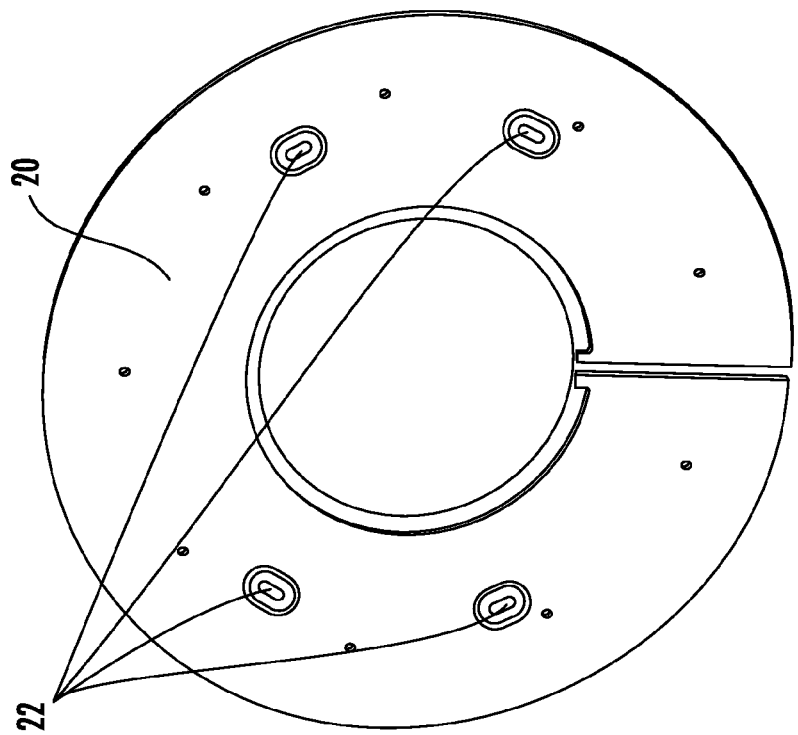
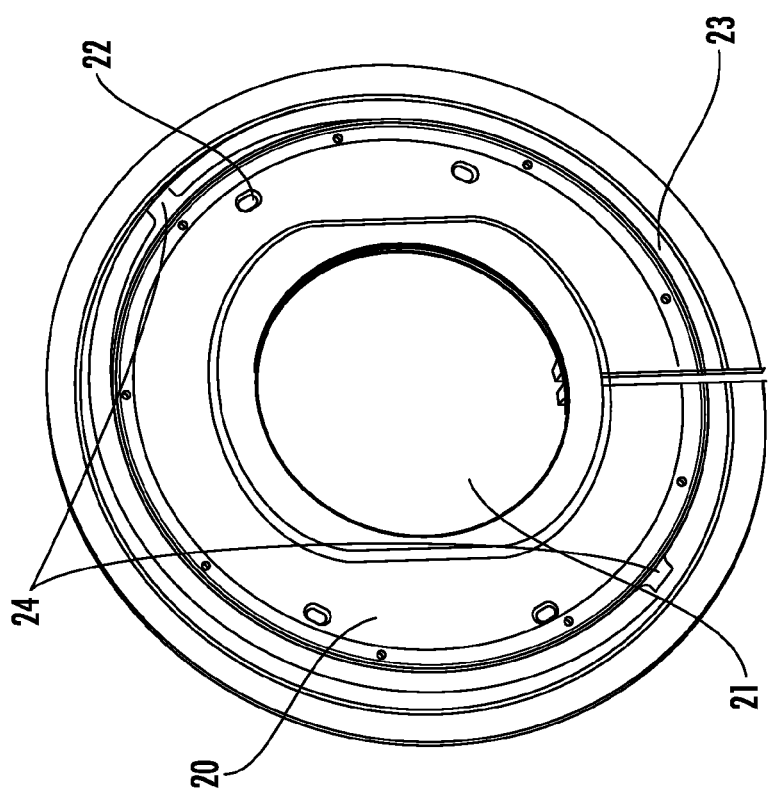

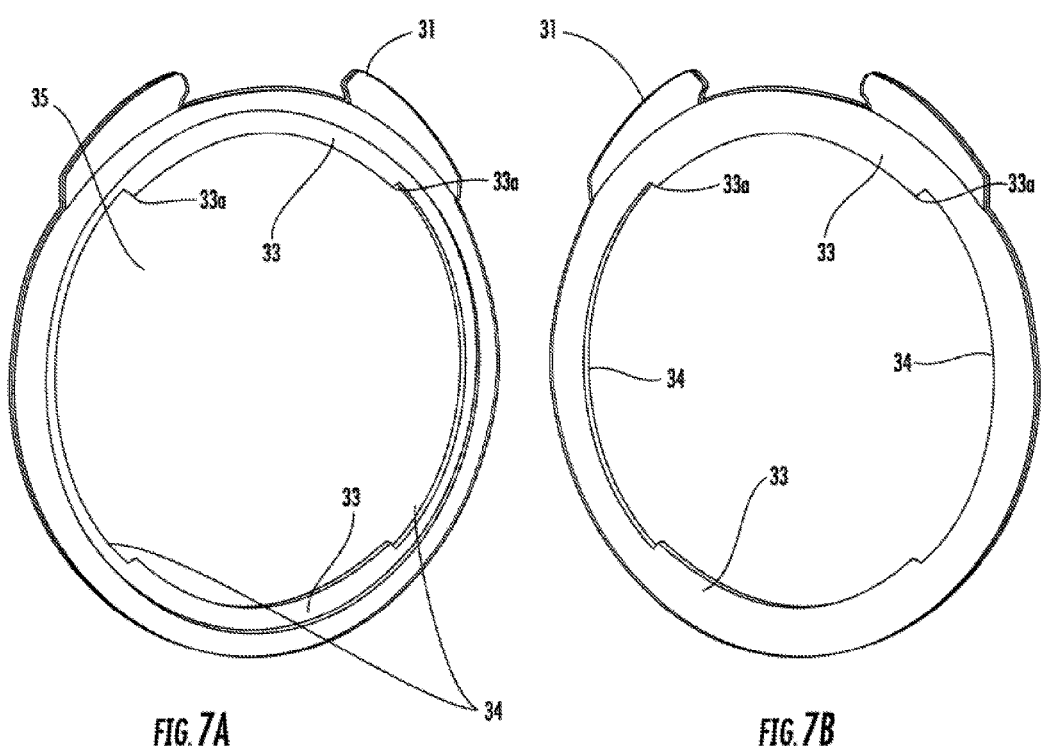

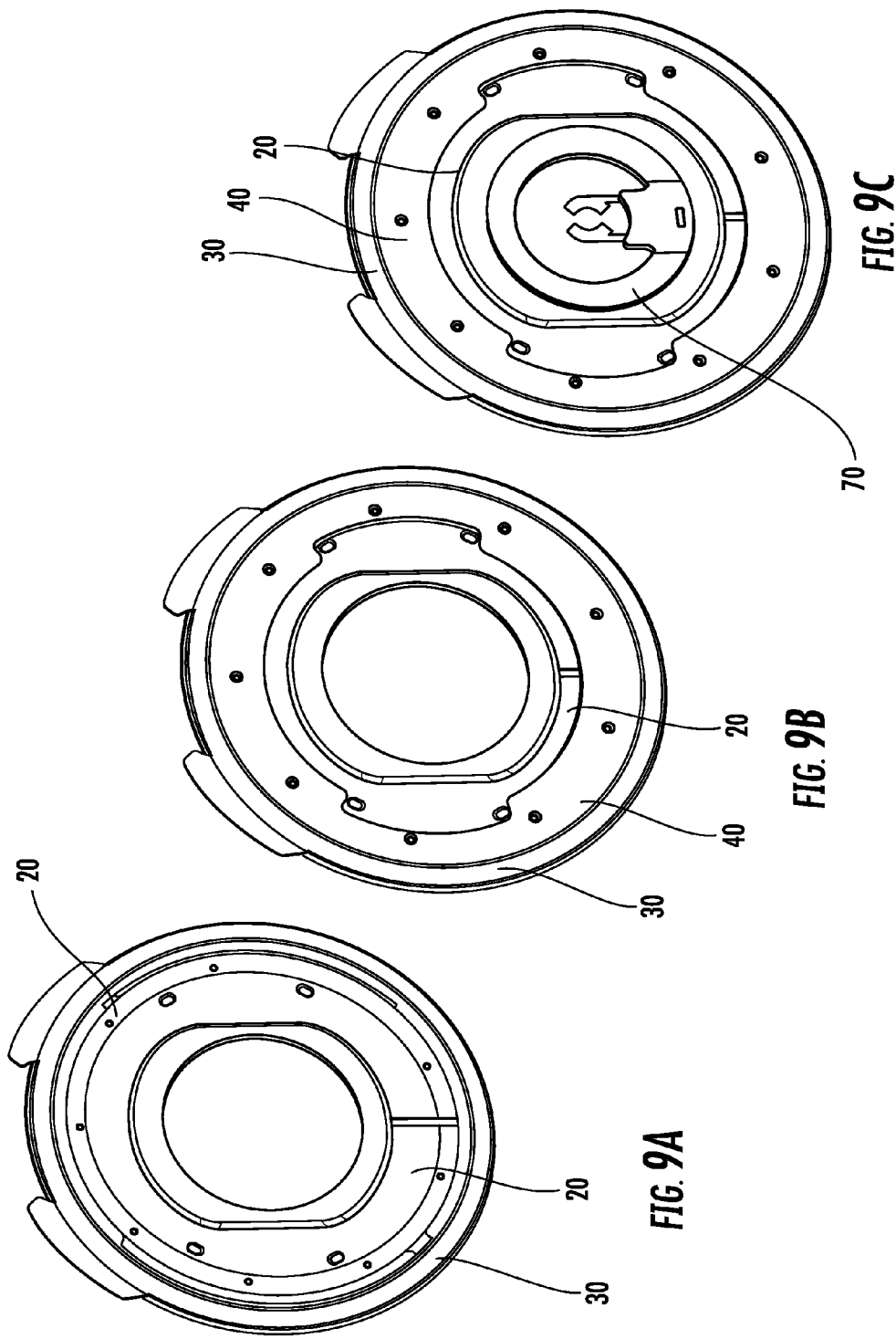

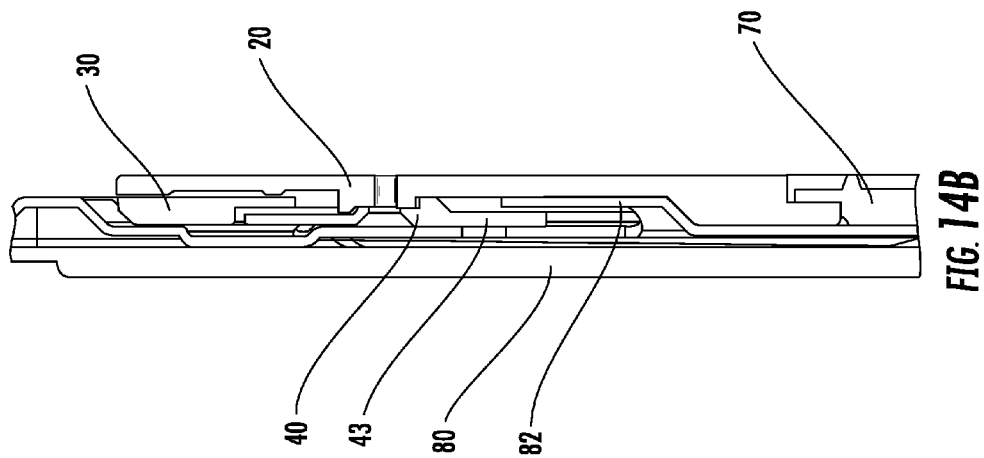
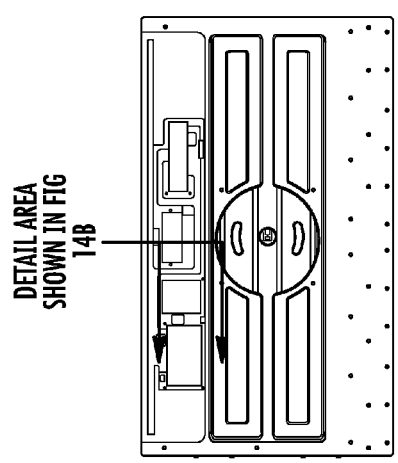
FIG. 14B
FIG. 14A

ROTATING WALL MOUNT FOR DISPLAY DEVICE

RELATED APPLICATIONS

This application is a Continuation in Part application of, and claims priority to, U.S. Non-Provisional application Ser. No. 14/213,729, filed Mar. 14, 2014, the disclosures and teaching of which are incorporated herein by reference, which in turn claims priority to U.S. Provisional Patent Application Nos. 61/800,681, filed Mar. 15, 2013, and 61/917,067, filed Dec. 17, 2013, the disclosures and teachings of which are incorporated herein by reference. The application also claims priority to U.S. Design patent application Ser. Nos. 29/469,599, 29/469,606, 29/469,621, 29/469,628, 29/469,633, 29/469,638, and 29/469,645, all of which were filed on Oct. 11, 2013, the disclosures and teachings of which are also all incorporated herein by reference.

FIELD OF THE INVENTION

The present invention relates generally to a system and method for pivotally mounting an electronic device on a wall. The invention provides a wall mount and a back cover coupled to the device that enables the device to easily rotate about its position on the wall.

BACKGROUND

In recent decades, many individuals have come to rely on electronic devices as their primary source of entertainment. This popularity has transformed these devices into thinner and lighter electronics that can be easily mounted or held in a user's hands. These new devices have also been designed to change orientation intuitively to allow for full rotation of the device. To create a more comfortable user experience, a large number of individuals prefer to mount these lighter devices on a wall. Many wall mounts have been designed for this purpose, but few allow for full rotation. The wall mounts that can provide full rotation are heavy, bulky, and unsightly. They can damage the wall they are mounted on and can be difficult to use. It is therefore advantageous to provide a light, easy to use, and unobtrusive wall mount that allows a device to fully rotate.

SUMMARY

The present invention described herein is a wall mount for electronic devices that allows for full rotation of the device and measures roughly 8 millimeters thick. Due to the size of the invention, it is essentially invisible behind the electronic device. It is also easy to rotate and causes minimal, if any, damage to the wall it is mounted on.

In general, in one aspect, exemplary embodiments of the present invention may provide a system for pivotally mounting a device to a wall comprising a power connector disc having contact pads, a wall plate configured to mount to the wall having a central opening and at least one mounting slot and at least one tab for limiting rotation, a rotator plate configured to coaxially engage said wall plate having at least one mounting horn extending in an upward direction from the circumference and a circular central opening having at least one inwardly projecting rotation tab, a face plate configured to coaxially engage said rotator plate and said wall plate and fixed to the wall plate to enclose the rotator plate between the wall plate and the face plate and having a circular central opening defined by an inner circular edge and at least one strip along the said inner edge extending into the interior of the central opening, and a back cover coupled to the device having contact points to receive said contact pads, at least one slot to receive said mounting horn and at least one flap to receive said strip, wherein said strips are positioned into said flaps in a first position and said strips are positioned out of said flaps in a second position, and wherein the rotation of said rotator plate with respect to said wall plate and said face plate is defined by the interaction of the at least one rotation limiting tab with the at least one rotation tab.

Implementations of the various exemplary embodiments of the present invention may include one or more of the following features: Said at least one horn slot may receive said at least one mounting horn from below when said electronic device is in the vertical position. Said first position may be a horizontal position and said second position may be a vertical position. The thickness of the said wall plate, said rotator plate, and said face plate collectively may be approximately 8 millimeters. The thickness of the said wall plate, said rotator plate, and said face plate collectively may not exceed 7.8 millimeters. Said face plate further may include at least one mounting slot corresponding with said at least one mounting slot in said wall plate. Said at least one strip on said face plate may have a knife edge. Said wall plate further may include a channel for a power cable. Said contact pads may be arcuate. Said contact pads may be connected to a connector which is removably attached to a power source. Said contact pads may provide continuous power to said power contact points during said rotation. Said wall plate may be configured to mount to the wall by screws. Said wall plate may be configured to mount to the wall by double sided adhesive tape. Said electronic device may be mounted no more than 2.5 mm away from said wall.

In another aspect, exemplary embodiments of the present invention may provide a method for pivotally mounting an electronic device to a wall comprising the steps of: providing a power connector disc having a pair of contact pads, providing a wall plate configured to mount to the wall having a central opening and having at least one mounting slot and at least one protruding rotation limiting tab, providing a rotator plate configured to coaxially engage said wall plate having at least one mounting horn extending in an upward direction from the circumference and a circular central opening having at least one inwardly projecting rotation tab, providing a face plate configured to coaxially engage said wall plate and said rotator plate, and fixed to the wall plate to enclose the rotator plate between the wall plate and the face plate, and having a circular central opening defined by an inner circular edge and at least one strip along the said circular inner edge extending into the interior of the central opening, providing a back cover configured to mount to the said electronic device having a pair of power contact points in contact with said pair of contact pads, at least one horn slot sized to receive said at least one mounting horn, and at least one flap sized to receive said at least one strip, mounting said wall plate, said rotator plate, and said face to a wall, positioning the said back cover connected to the display device above the said rotator plate and lowering said back cover connected to the display device onto the rotator plate such that the said at least one horn slot lays on top of said at least one mounting horn, wherein said strips are positioned into said flaps in a first position and said strips are positioned out of the said flaps when said device is in a second position, and wherein rotation of said rotator plate with respect to said wall plate and said face plate is defined by the interaction of the at least one rotation limiting tab with the at least one rotation tab.

Implementations of the various exemplary embodiments of the present invention may include one or more of the following features: Said at least one horn slot may receive said at least one mounting horn from below when said electronic device is in the vertical position. Said first position may be a horizontal position and said second position may be a vertical position. Said wall plate, said rotator plate, and said face plate collectively may be approximately 8 millimeters. The thickness of the said wall plate, said rotator plate, and said face plate collectively may not exceed 7.8 millimeters. Said face plate further may include at least one mounting slot corresponding with said at least one mounting slot in said wall plate. Said at least one strip on said face plate may have a knife edge. Said wall plate further may include a channel for a power cable. Said contact pads may be arcuate. Said contact pads may be connected to a connector which is removably attached to a power source. Said contact pads may provide continuous power to said power contact points during said rotation. Said wall plate may be configured to mount to the wall by screws. Said wall plate may be configured to mount to the wall by double sided adhesive tape. Said electronic device may be mounted no more than 2.5 mm away from said wall.

In another aspect, exemplary embodiments of the present invention may provide a system for pivotally mounting a display device to a wall comprising: a display device having a back cover, a power connector disc having a pair of contact pads, a wall plate configured to mount to the wall having a central opening and having at least one mounting slot and at least one protruding rotation limiting tab, a rotator plate configured to coaxially engage said wall plate having at least one mounting horn extending upward from the circumference and a circular central opening having at least one inwardly projecting rotation tab, a face plate configured to coaxially engage said rotator plate and said wall plate, and fixed to the wall plate to enclose the rotator plate between the wall plate and the face plate, and having a circular central opening defined by an inner circular edge and at least one strip along the said inner circular edge extending into the interior of the central opening, the back cover configured to mount to the display device having a pair of power contact points in contact with said pair of contact pads, at least one horn slot sized to receive to said mounting horn and at least one flap sized to receive said at least one strip, wherein said strips are positioned into said flaps in a first position and said strips are positioned out of said flaps in a second position, and wherein rotation of said rotator plate with respect to said wall plate and said face plate is defined by the interaction of the at least one rotation limiting tab with the at least one rotation tab.

Implementations of the various exemplary embodiments of the present invention may include one or more of the following features: Said at least one horn slot may receive said at least one mounting horn from below when said display device is in the vertical position. Said first position may be a horizontal position and said second position may be a vertical position. The thickness of the said wall plate, said rotator plate, and said face plate collectively may be approximately 8 millimeters. The thickness of the said wall plate, said rotator plate, and said face plate collectively may not exceed 7.8 millimeters. Said face plate further may include at least one mounting slot corresponding with said at least one mounting slot in said wall plate. Said at least one strip on said face plate may have a knife edge. Said wall plate further may include a channel for a power cable. Said contact pads may be arcuate. Said contact pads may be connected to a connector which is removably attached to a power source. Said contact pads may provide continuous power to said power contact points during said rotation. Said wall plate may be configured to mount to the wall by screws. Said wall plate may be configured to mount to the wall by double sided adhesive tape. Said electronic device may be mounted no more than 2.5 mm away from said wall.

In another aspect, exemplary embodiments of the present invention may provide a method for pivotally mounting a display device to a wall comprising the steps of: providing a power connector disc having a pair of contact pads, providing a wall plate configured to mount to the wall having a central opening and having at least one mounting slot and at least one protruding rotation limiting tab, providing a rotator plate configured to coaxially engage said wall plate having at least one mounting horn extending in an upward direction from the circumference and a circular central opening having at least one inwardly projecting rotation tab, providing a face plate configured to coaxially engage said wall plate and said rotator plate, and fixed to the wall plate to enclose the rotator plate between the wall plate and the face plate, and having a circular central opening defined by an inner circular edge and at least one strip along the said inner circular edge extending into the interior of the central opening, providing a back cover attached to the back of the display device configured to mount to the said display device having a pair of power contact points in contact with said pair of contact pads, at least one horn slot sized to receive said at least one mounting horn, and at least one flap sized to receive said at least one strip, mounting said wall plate, said rotator plate, and said face to a wall, positioning the said back cover connected to the display device above the said rotator plate and lowering said back cover connected to the display device onto the rotator plate such that the said at least one horn slot lays on top of said at least one mounting horn, wherein said strips are positioned into said flaps in a first position and said strips are positioned out of the said flaps when said device is in a second position, and wherein rotation of said rotator plate with respect to said wall plate and said face plate is defined by the interaction of the at least one rotation limiting tab with the at least one rotation tab.

Implementations of the various exemplary embodiments of the present invention may include one or more of the following features: Said at least one horn slot may receive said at least one mounting horn from below when said display device is in the vertical position. Said first position may be a horizontal position and said second position may be a vertical position. The thickness of the said wall plate, said rotator plate, and said face plate collectively may be approximately 8 millimeters. The thickness of the said wall plate, said rotator plate, and said face plate collectively may not exceed 7.8 millimeters. Said face plate may further include at least one mounting slot positioned to corresponding with said at least one mounting slot in said wall plate. Said at least one strip on said face plate may have a knife edge. Said wall plate may further include a channel for a power cable. Said contact pads may be arcuate. Said contact pads may provide continuous power to said power contact points during said rotation. Said wall plate may be configured to mount to the wall by screws. Said wall plate may be configured to mount to the wall by double sided adhesive tape. Said electronic device may be mounted no more than 2.5 mm away from said wall.

BRIEF DESCRIPTION OF THE DRAWINGS

FIG. 1 depicts an oblique overall view of the wall mount of the present invention;

FIG. 2A illustrates rotation of the electronic device using the wall mount;

FIG. 2B illustrates rotation of the electronic device using the wall mount;

FIG. 3A is a view of the wall mount mounted on a wall;

FIG. 3B is a magnified side view of the electronic device mounted to a wall showing the wall mount between the wall and the electronic device;

FIG. 5 is an exploded view of the wall mount with the power connector disc;

FIG. 6A is an oblique front view of the wall plate;

FIG. 6B is an oblique back view of the wall plate;

FIG. 7A is an oblique front view of the rotator ring;

FIG. 7B is an oblique back view of the rotator ring;

FIG. 9A is an oblique new view of the rotator ring engaged with the wall plate in a first assembly step;

FIG. 9B is a front view of the face plate, rotator ring, and wall plate in a second assembly step;

FIG. 9C is a front view of the face plate, rotator ring, wall plate, and power connector disc in a third assembly step;

FIG. 14A is a front view of the back cover in the horizontal position indicating the area of detail illustrated in FIG. 14*b*;

FIG. 14B is a cross-sectional detail view of the wall mount engaged with the back plate in the horizontal position;

DETAILED DESCRIPTION

Figure 4B:
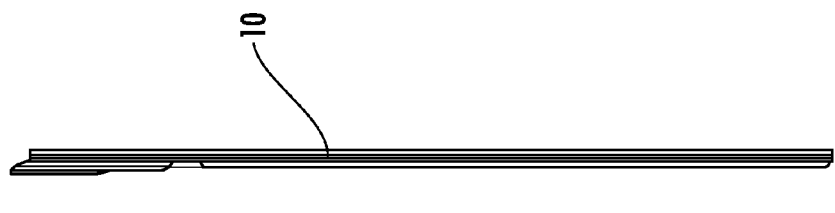
FIG. 4B is a side view of the wall mount.
Figure 4A:
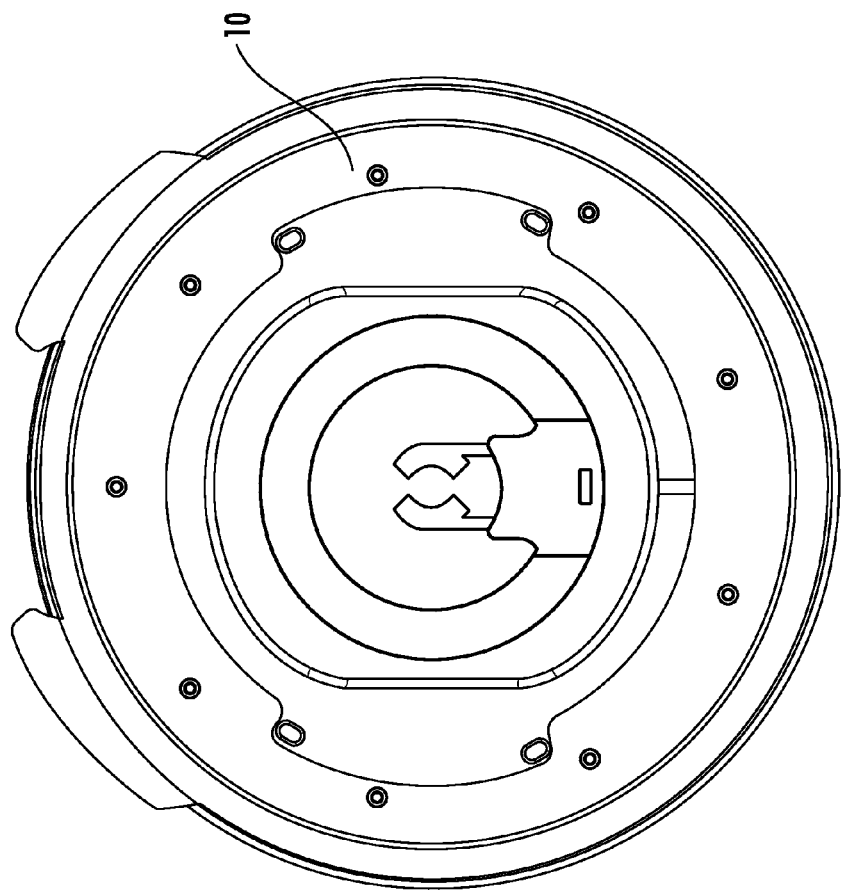
FIG. 4A is a front view of the wall mount.
Figure 8B:
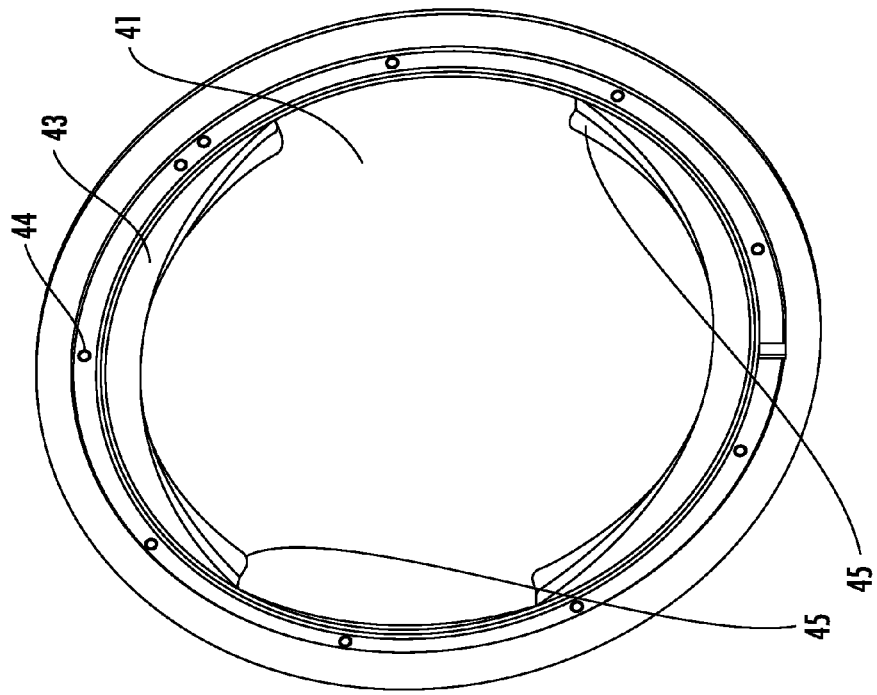
FIG. 8B is an oblique back view of the face plate.
Figure 8A:
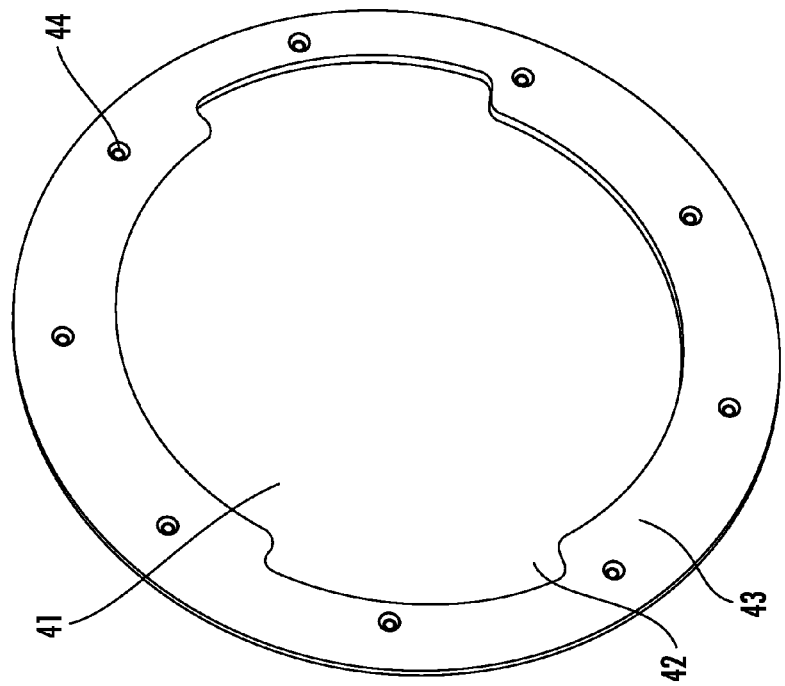
FIG. 8A is an oblique front view of the face plate.
Figure 10B:
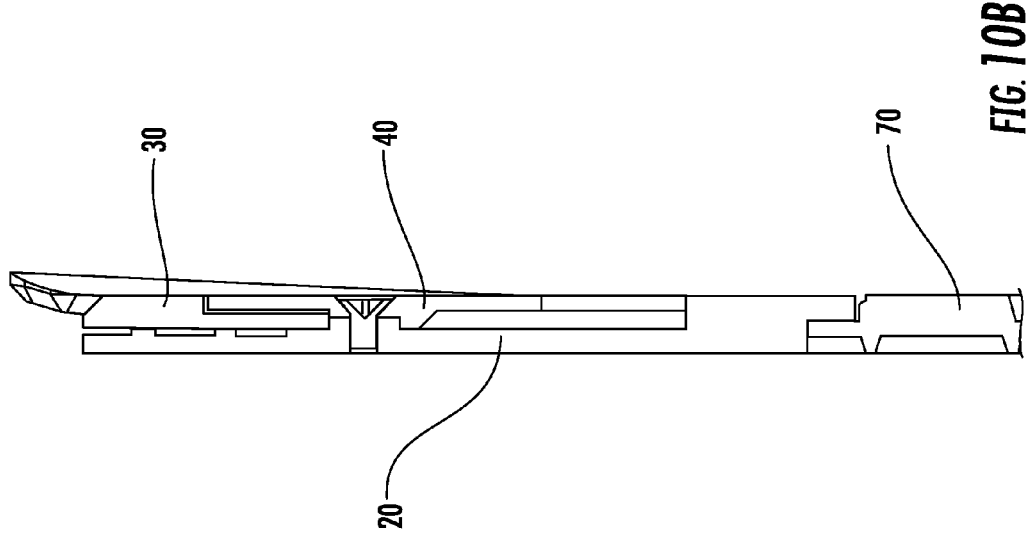
FIG. 10B is a cross-sectional view of the top half of the wall mount and power connector disc.
Figure 10A:
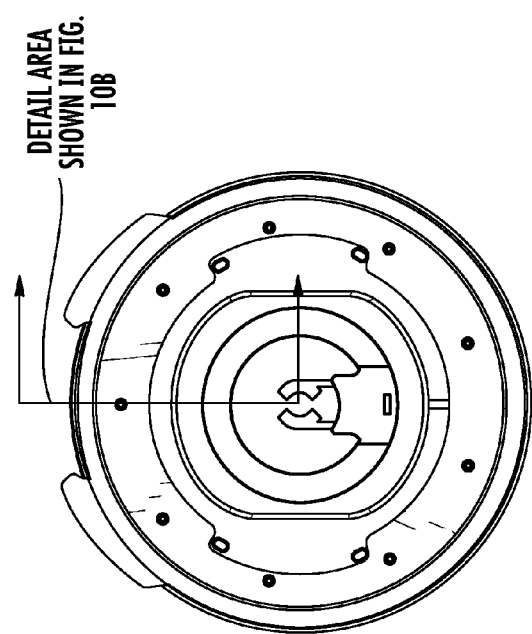
FIG. 10A is a front view of the wall mount indicating the area of detail illustrated in FIG. 10B.
Figures 10C, 10D:
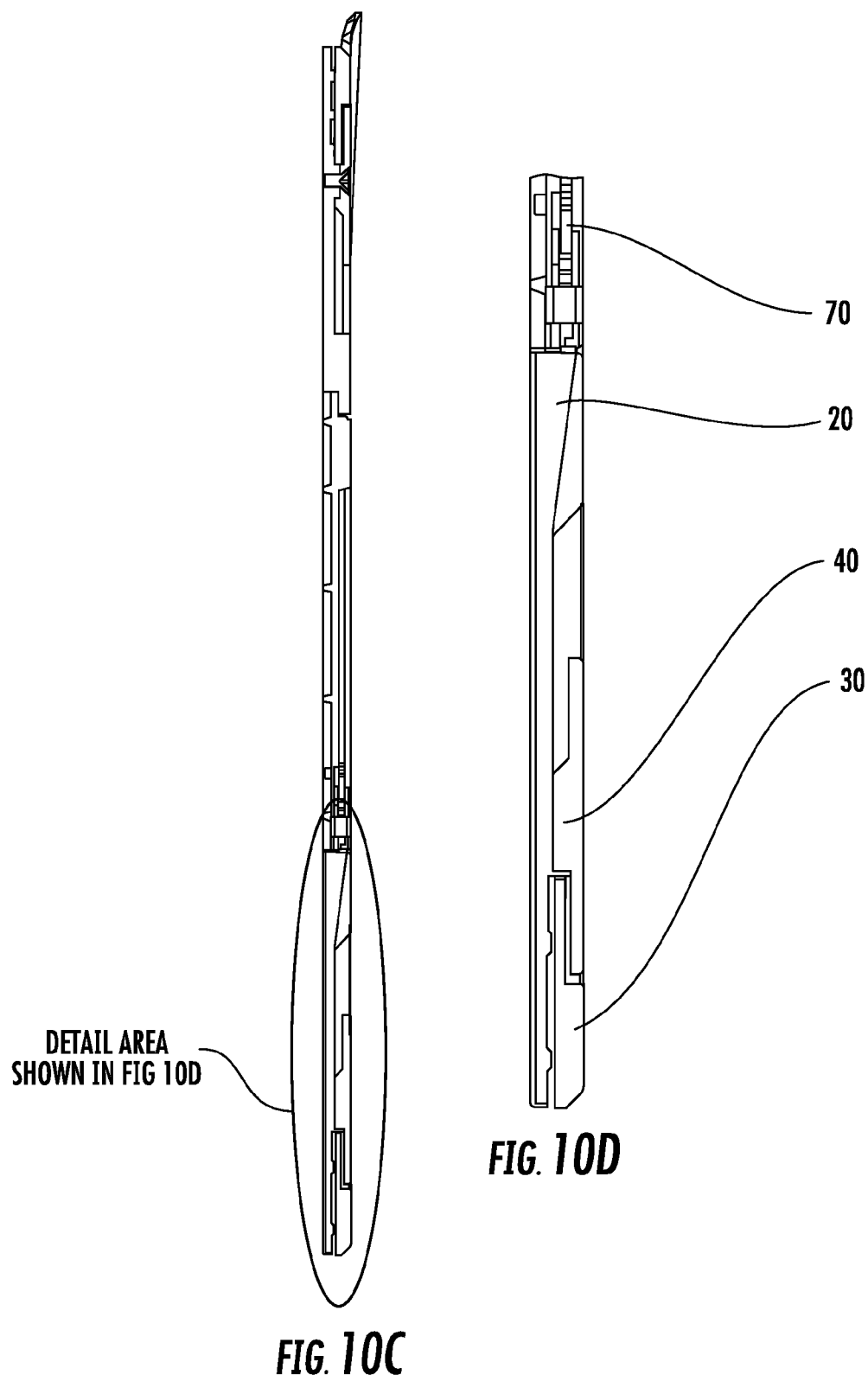
FIG. 10C is a cross sectional view of the wall mount indicating the area of detail illustrated in FIG. 10D is a detailed view of the bottom half of the wall mount showing the interactions between the face plate, rotator ring, and wall plate.
Figure 11B:
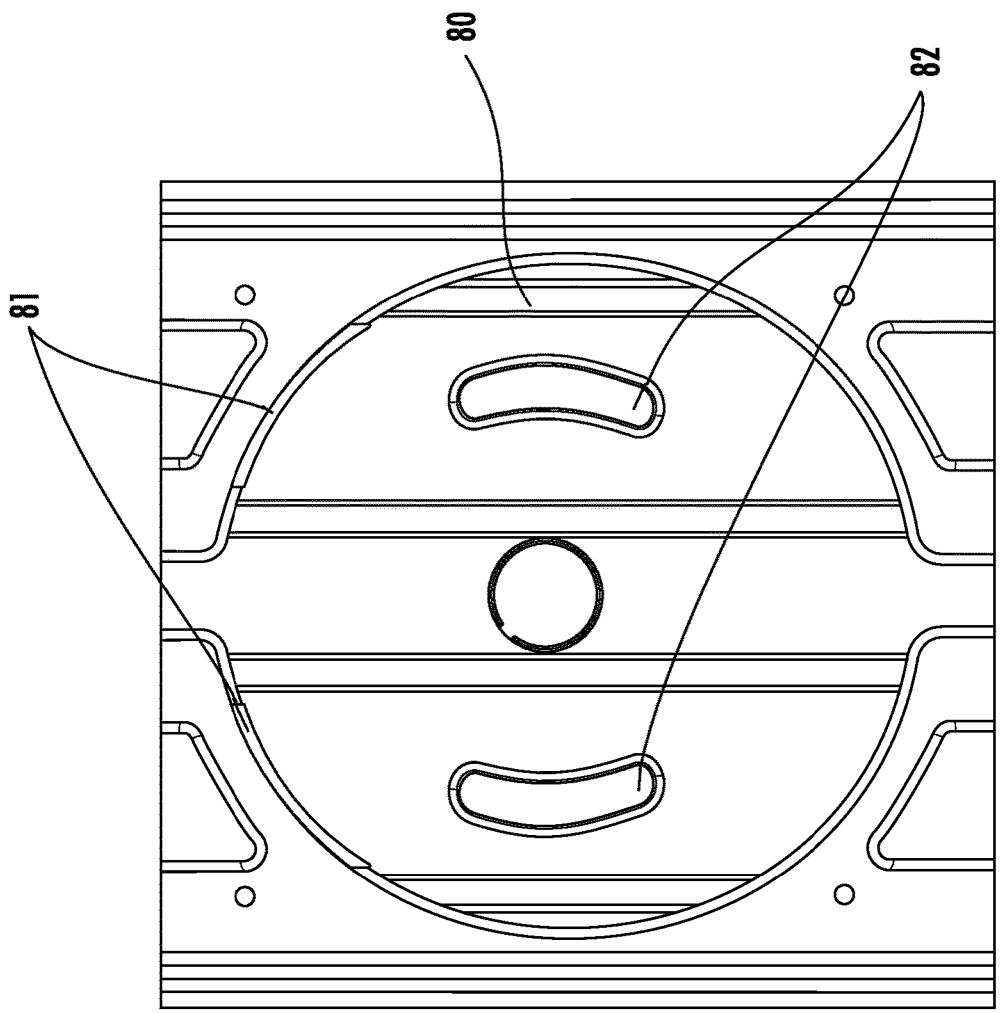
FIG. 11B is a detailed view of the back cover of an electronic device.
Figure 11A:
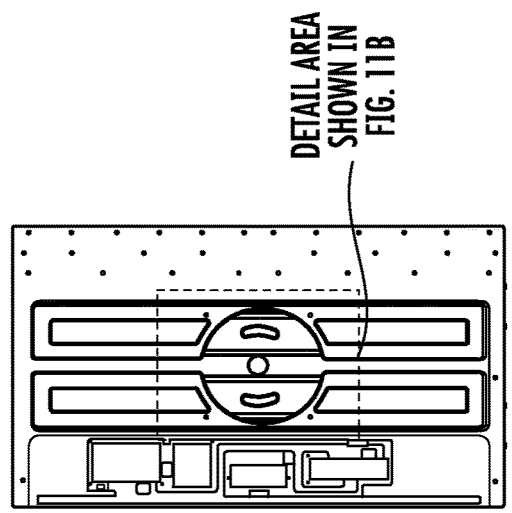
FIG. 11A is a front view of the back cover of an electronic device.
Figure 12A:
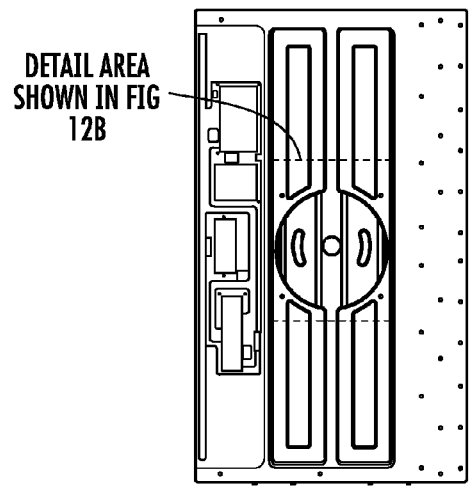
FIG. 12A is an oblique view of the back cover of an electronic device.
Figure 12B:
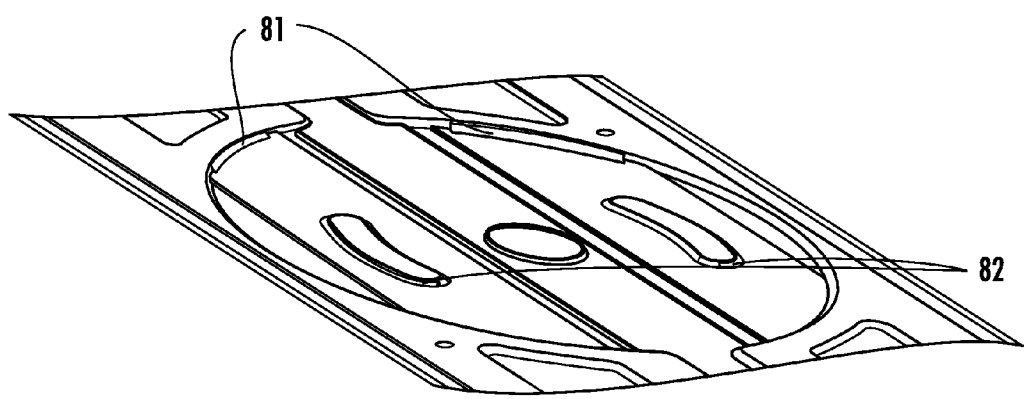
FIG. 12B is a detailed oblique view of the back cover of an electronic device.
Figure 13B:
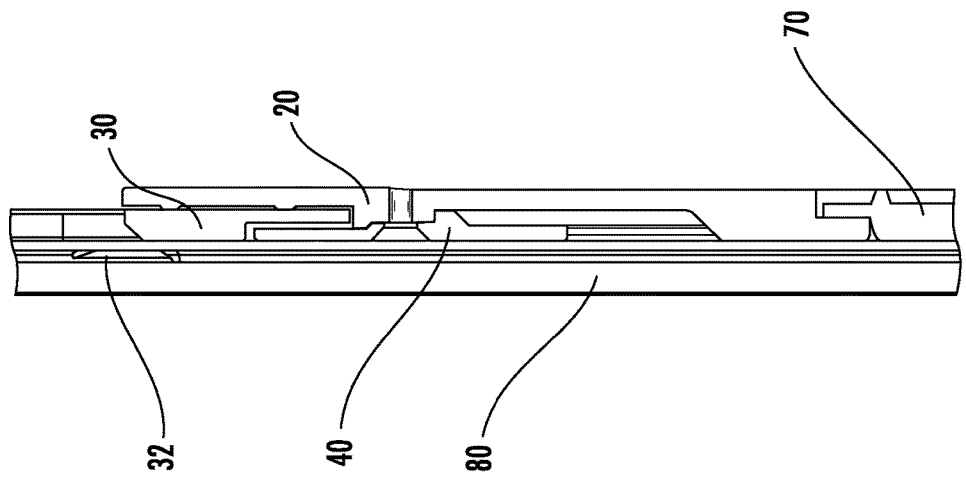
FIG. 13B is a cross-sectional detail view of the wall mount engaged with the back plate in the vertical position.
Figure 13A:
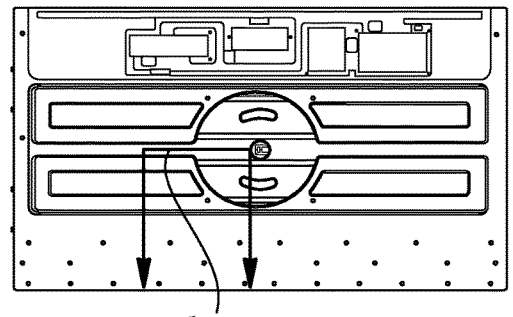
FIG. 13A is a front view of the back cover in the vertical position indicating the area of detail illustrated in FIG. 13*b*.

Embodiments of the wall mount 10 of the present invention preferably allow a display device 50 to be securely mounted on a wall in such a way that a user can easily rotate the device between vertical and horizontal orientations without losing continuous power to the device. The wall mount is secured to the wall on one end and interlocked into the display device on the other. The wall mount 10 is preferably 7.8 millimeters thick at its thickest point and 5.7 millimeters at its thinnest point with a 288 millimeter diameter. These measurements of the preferred embodiment with a thicker upper section and a narrower lower section are shown in FIG. 4. When coupled to the display device and mounted on a wall, the wall mount holds the device roughly 2.5 millimeters from the wall. The wall mount consists of four main components, a wall plate, a face plate, a rotator ring, and a power disc, as seen in FIGS. 1 and 5. The pieces of the wall mount are preferably Teflon coated to decrease friction, and can be made of various materials, although steel is preferred.

The wall plate 20, shown in FIG. 6, is closest to the wall and is a circular piece fastened into the wall's surface by screws or another fastening mechanism. In its center is a circular orifice 21 surrounded by a recessed circular edge in which the power disc 70 engages such that the wall plate, and the other wall mount 10 components, encircle the power disc 70. The outer wall plate has slots 22 for screws or other tools such as double sided adhesive tape to mount and secure the wall mount to the wall, as well as recessed and projecting rings 23 at varying distances from the center for interacting with the other components of the wall mount. At least one of the indented rings will interact with the rotator ring 30 and has two stops 24 radially opposite each other to limit the range of rotation of the invention.

The rotator ring 30, shown in FIG. 7, is formed to be positioned over the outermost portions of the wall plate 20. It is similarly a circular shape with a center circular orifice 35. Preferably, the top of the rotator plate's outside edge has protruding mounting horns 31 that interlock with the back cover 80 of the display device 50 and hold the display device 50 in place when mounted on a wall 60. The rotator ring also has extended segments 33 on its interior edge which interact with the stops on the wall plate to determine the range of rotation.

Figure 24:
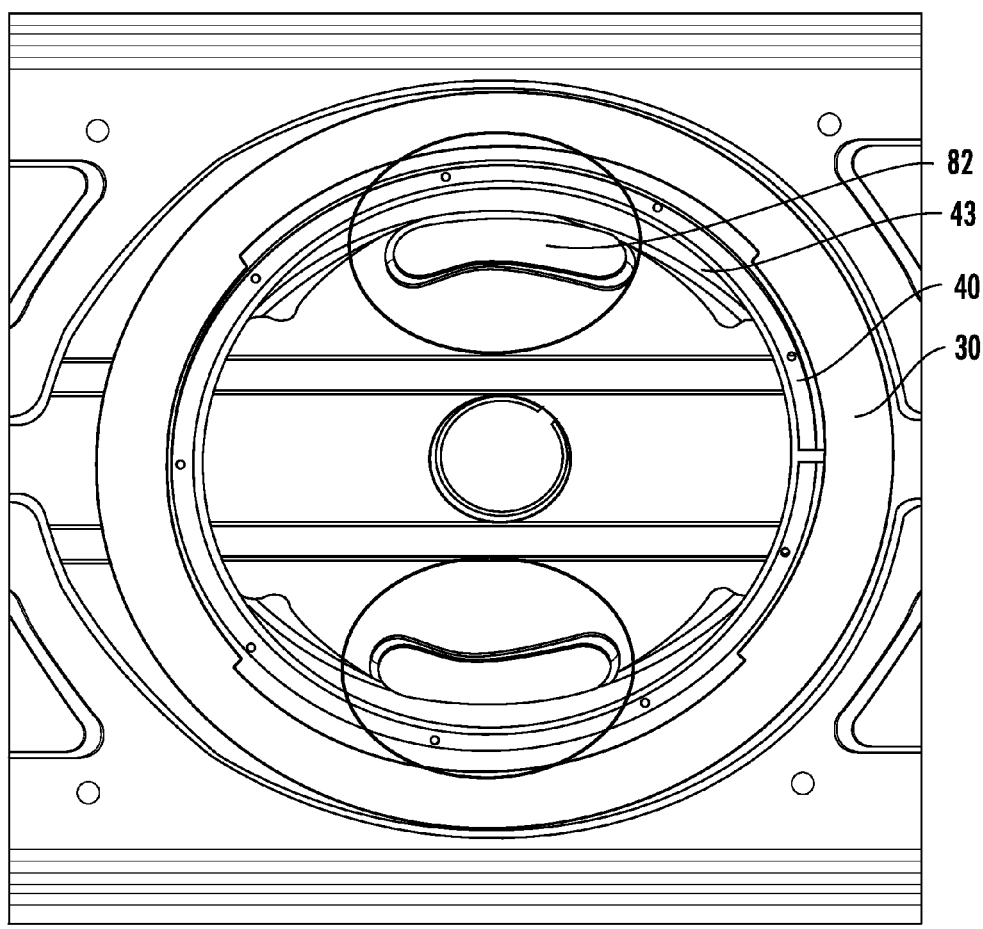
FIG. 24 illustrates further rotation of the back plate and rotator plate in the wall mount from a back view. The wall plate is not shown.
Figure 25:
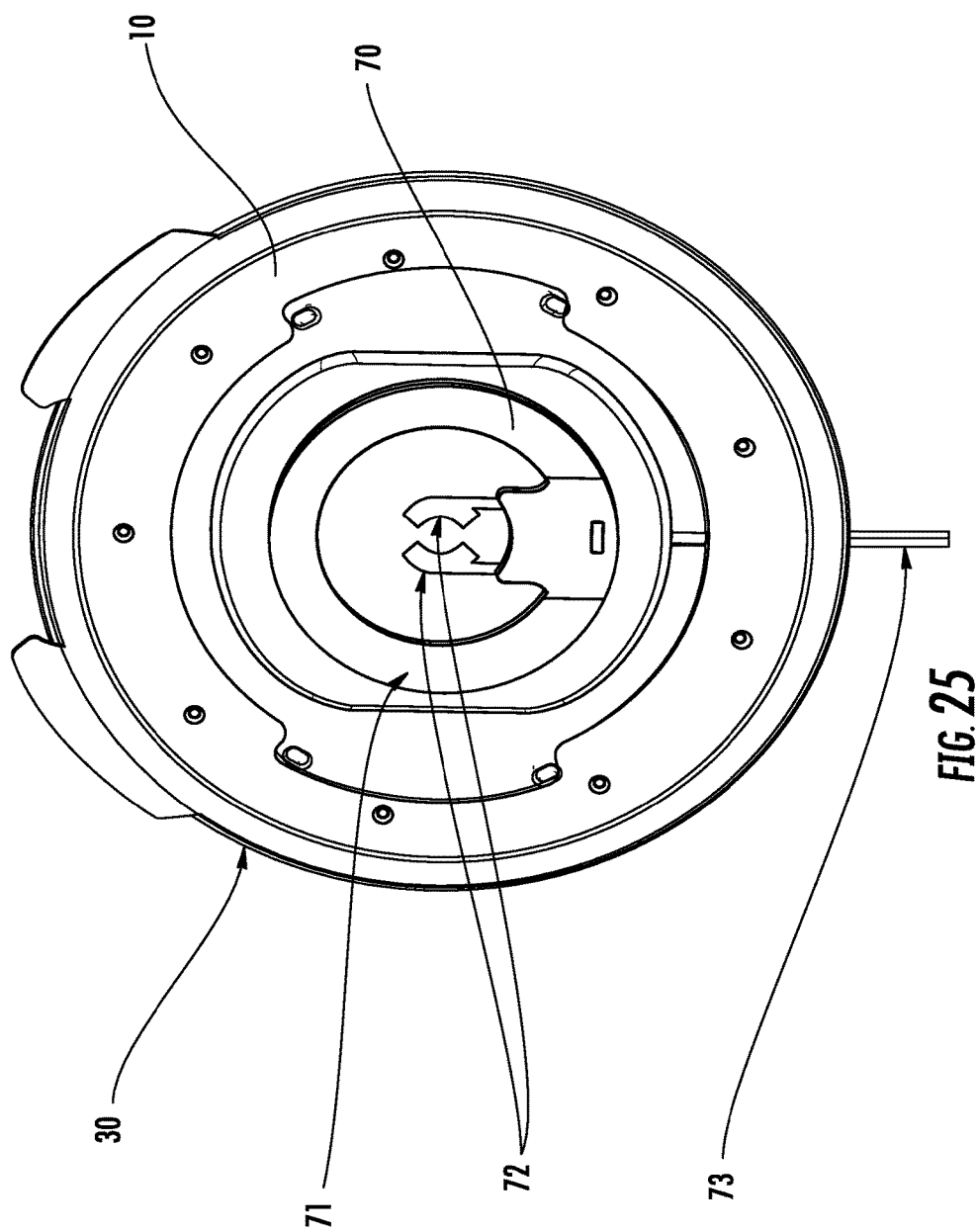
FIG. 25 is a front view of the power disc inside the wall mount.
Figure 26C:
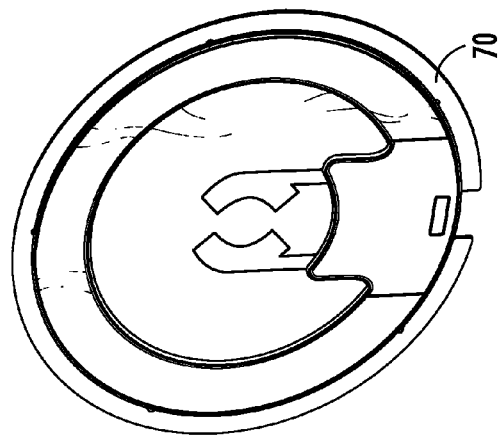
FIG. 26C is a front oblique view of the power disc.
Figure 26B:
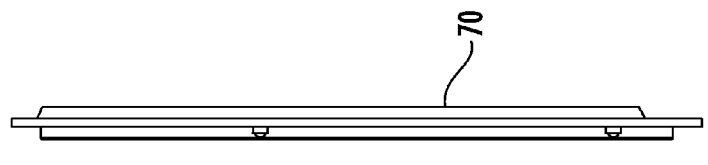
FIG. 26B is a side view of the power disc.
Figure 26A:
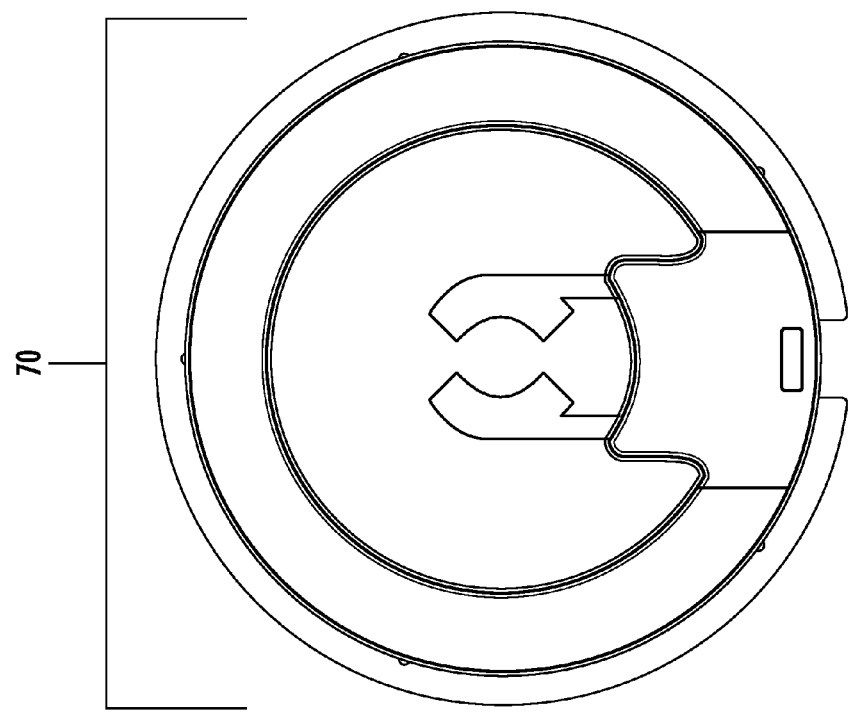
FIG. 26A is a front view of the power disc.

Then the face plate 40 fits over the inner portion of the rotator ring 30 and engages with the wall plate 20 at a radial location approximately between the center wall plate's center and edge. It is also a circular shape with a center orifice 41. The inner edge of the face plate is shaped to have large diameter arcs 42 forming slots that, when assembled, avoid covering the mounting slots 22 on the wall plate, as seen in FIG. 9. The inner edge of the face plate is also shaped to have smaller diameter arcs 43 with knife edges 45. These smaller diameter arcs form tabs which will fit behind the back cover 80 of the device to secure the device when it is oriented horizontally, as in FIG. 24. The outer circle of the face plate also has slots 44 which match up with at least some of the mounting slots 22 on the wall plate 20 for joining the two components by screw or other device and effectively enclosing rotator ring 30 between the components. In preferred embodiments, the screw or other mechanism in slots 22 and 44 extend to the wall 60 and hold wall mount 10 in place on a wall or other surface. This embodiment is illustrated in FIGS. 10A, 10B, 34A, 34B, 35A, and 35B.

Figure 27:
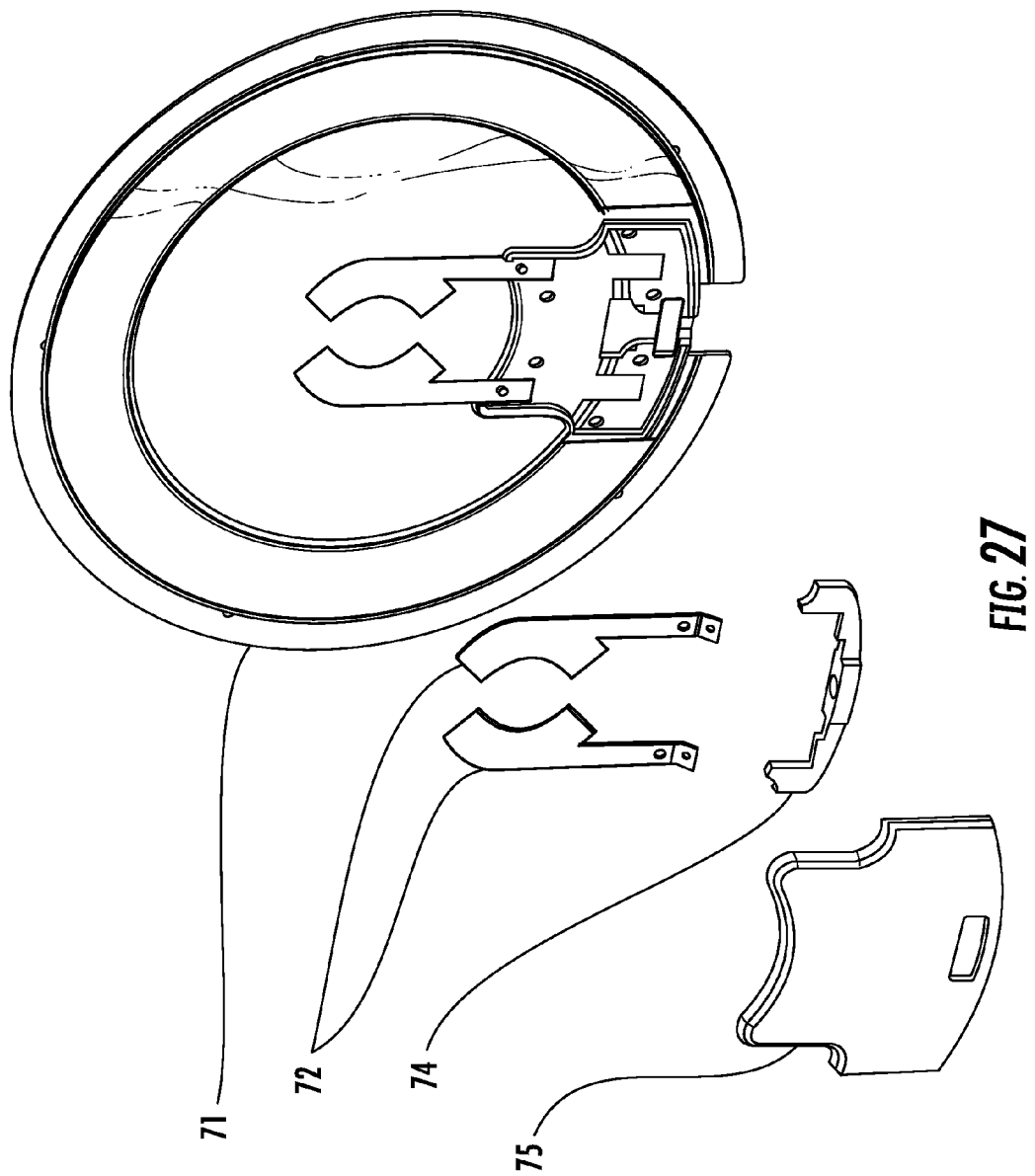
FIG. 27 is an exploded view of the power disc.
Figure 28B:
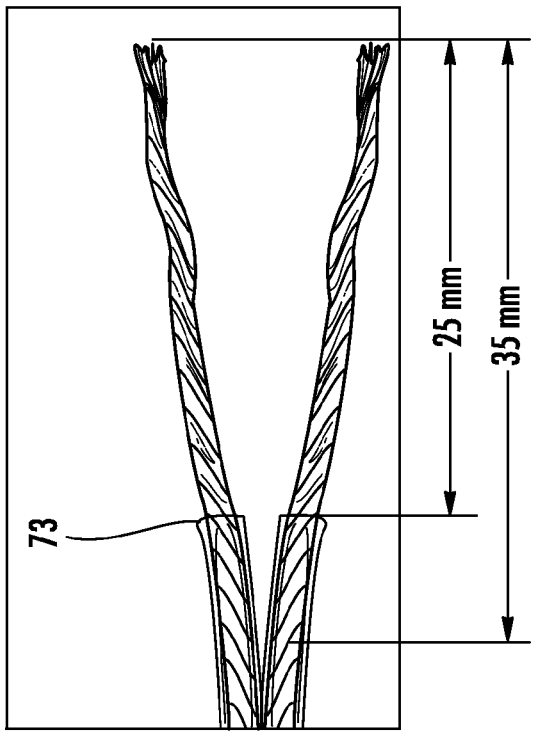
FIG. 28B is a detailed view of the wire and cable to be used in the power disc.
Figure 28A:
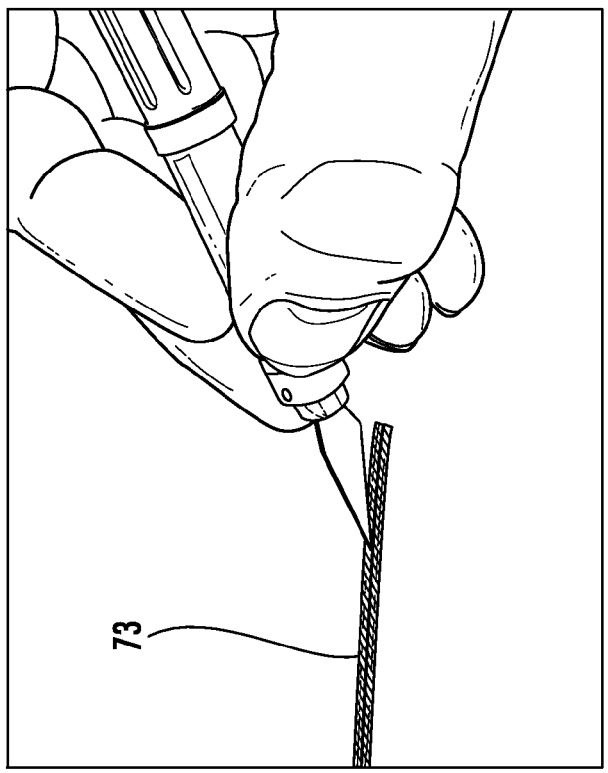
FIG. 28A is an illustration of separating electrical cables to be used in the power disc.
Figure 29A:
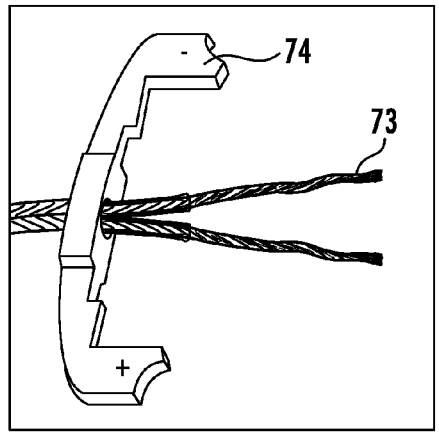
FIG. 29A is a front view of the wire of the power disc in the strain relief.
Figure 29B:
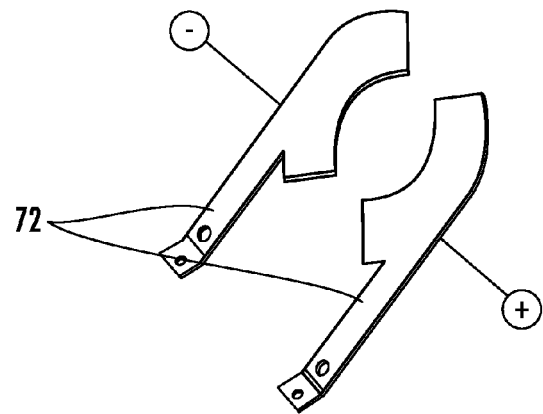
FIG. 29B is a detailed view of the contact pads on the wire.
Figure 29C:
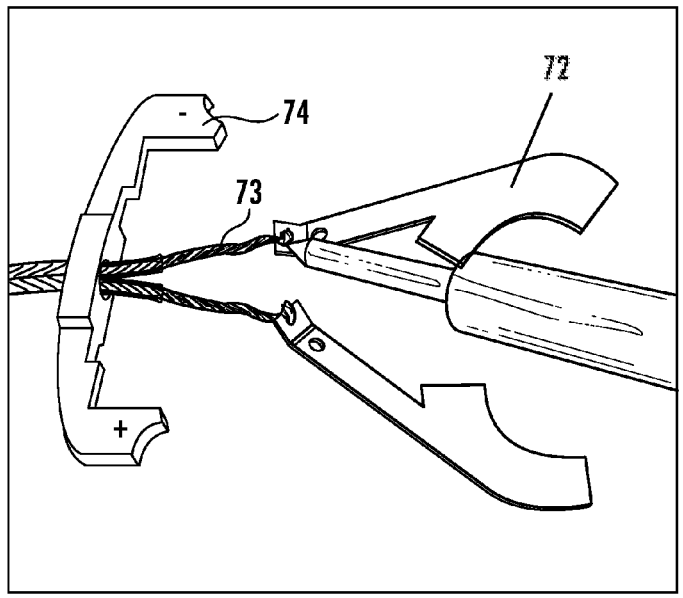
FIG. 29C is an illustration of connecting the contact pads to the wires on the strain relief.
Figure 30A:
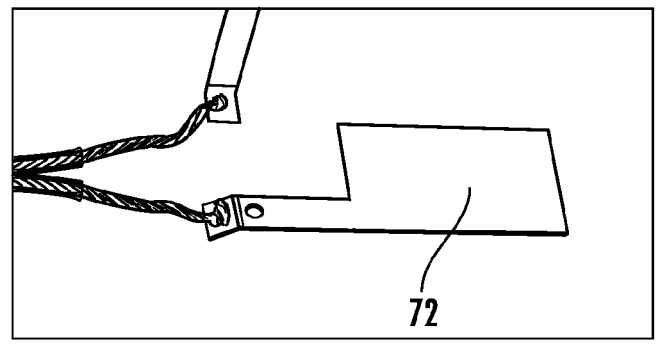
FIG. 30A shows the contact pads before they are constructed.
Figure 30B:
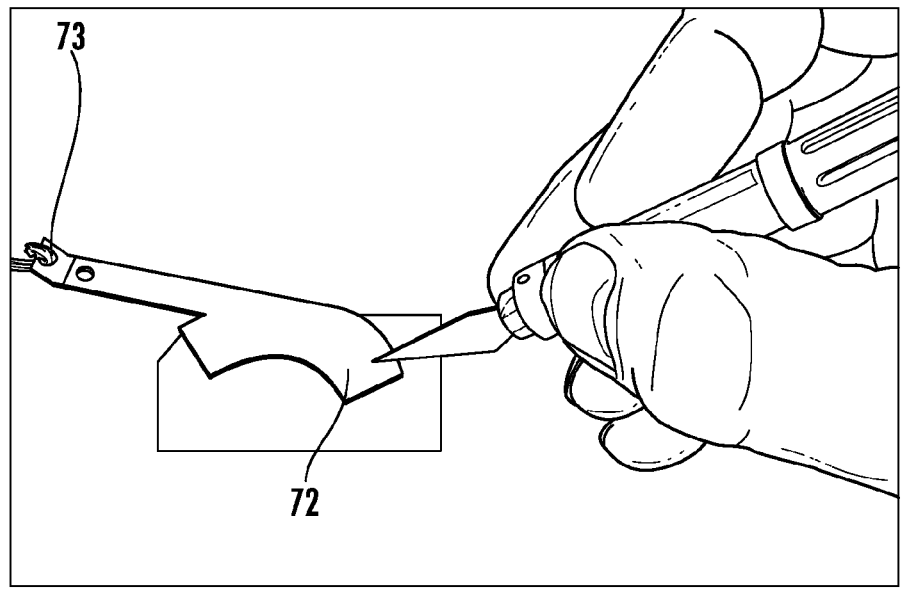
FIG. 30B is an illustration of the construction of the contact pads.
Figure 31:
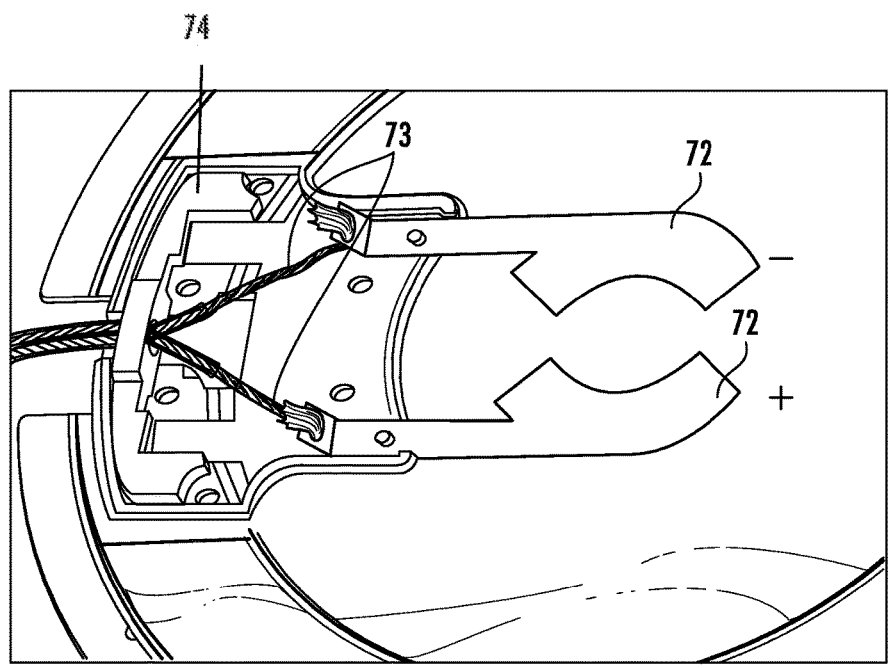
FIG. 31 is a front view of the power disc without the cover to show the placement of the strain relief, wires, and contact pads.
Figure 32A:
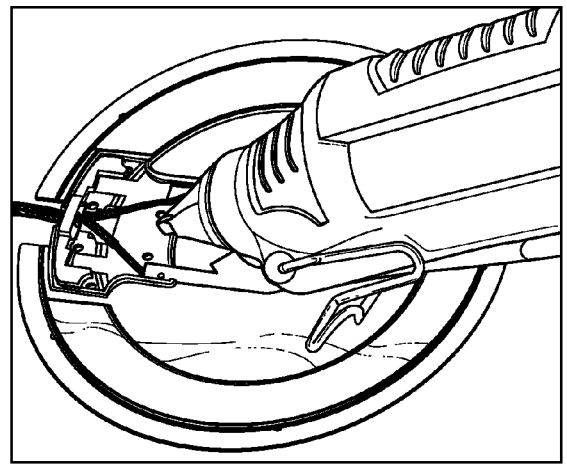
FIG. 32A is an illustration of securing the wires to the main disc.
Figure 32B:
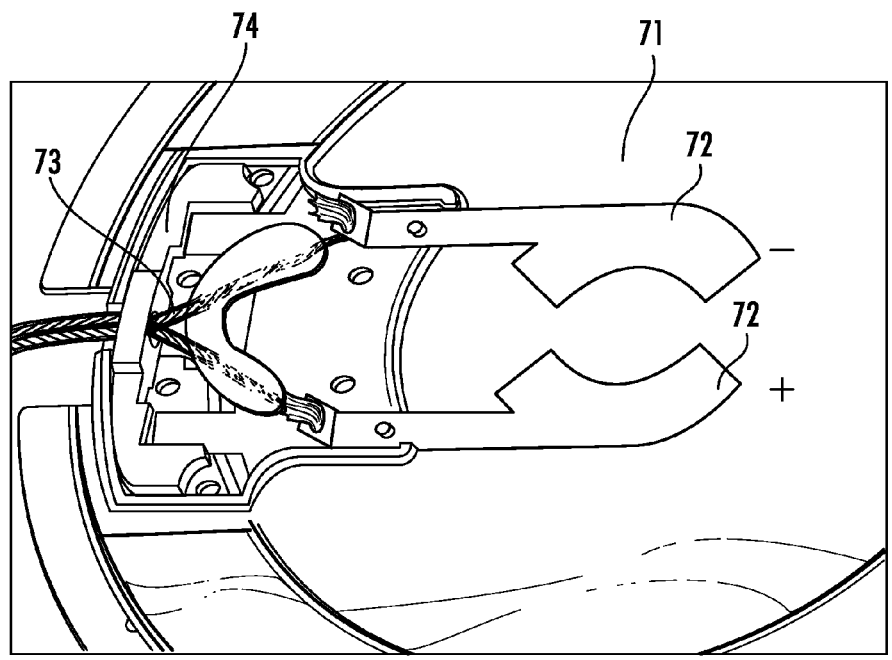
FIG. 32B is an illustration of where to applying the securing glue to the wires.
Figure 33A:
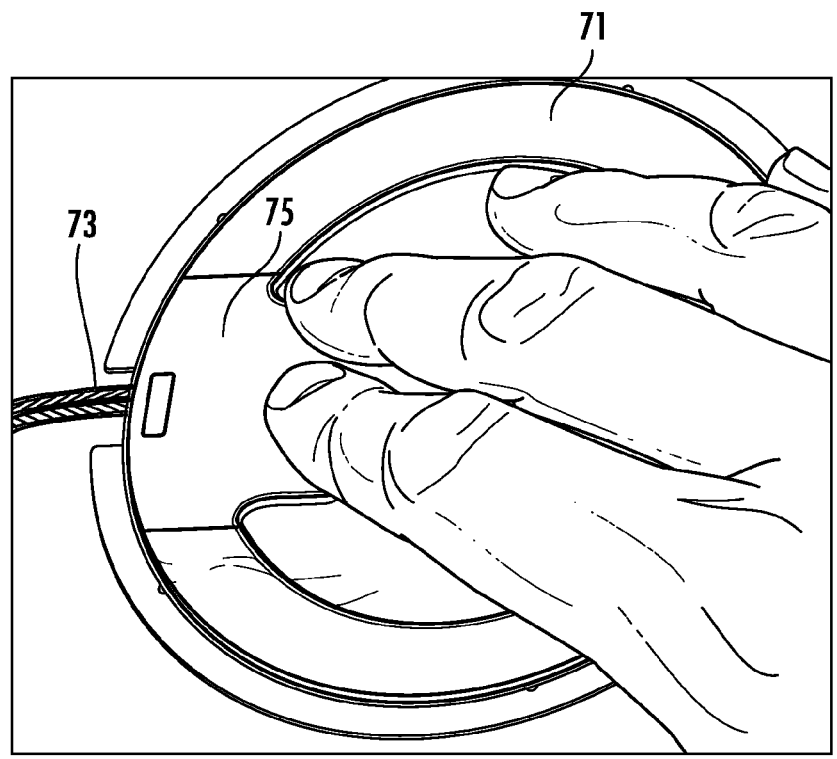
FIG. 33A is an illustration of the cover being positioned on the power disc from a front perspective.
Figure 33B:
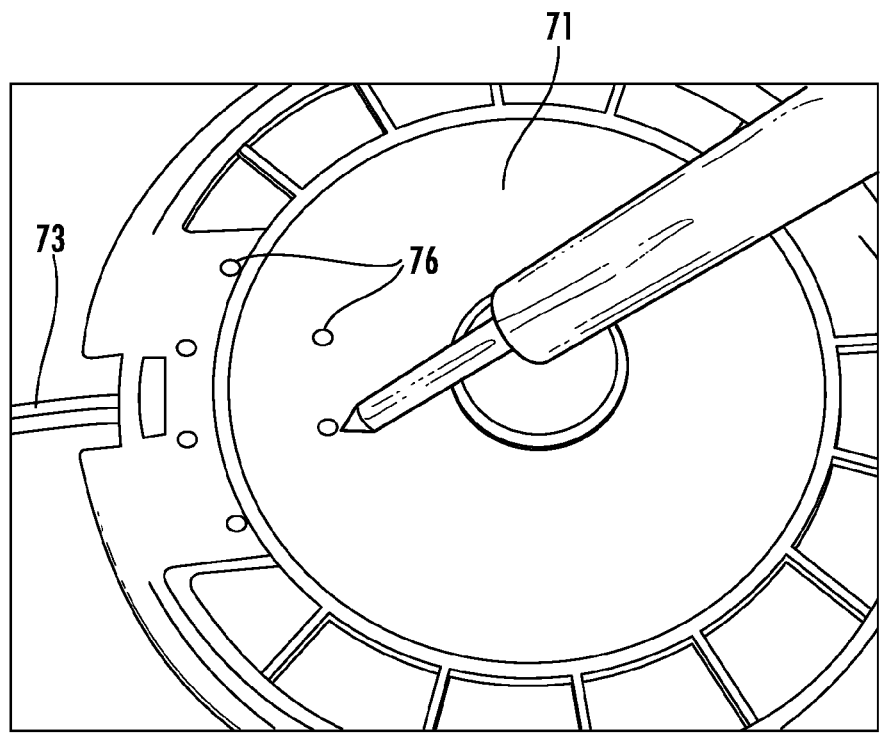
FIG. 33B is an illustration of the cover being positioned on the power disc from a back perspective.
Figure 34A:
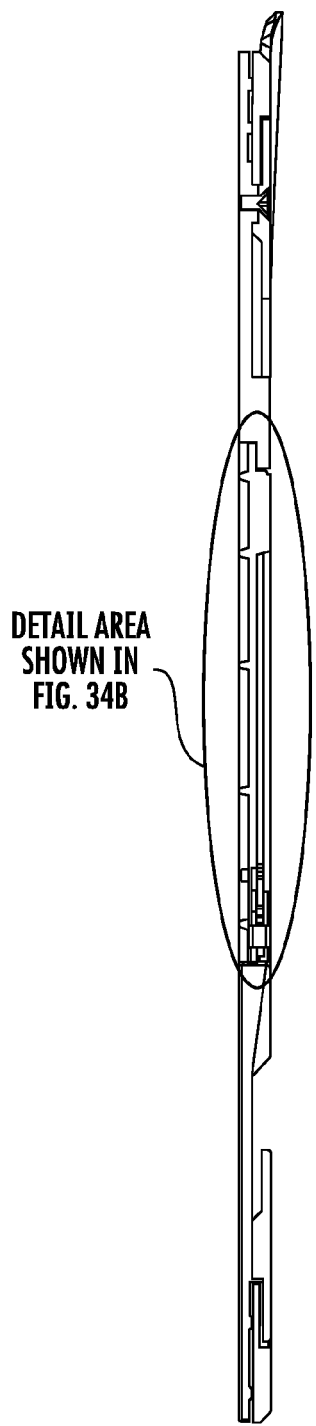
FIG. 34A is a side cross sectional view indicating the area of detail illustrated in FIG. 34B.
Figure 34B:
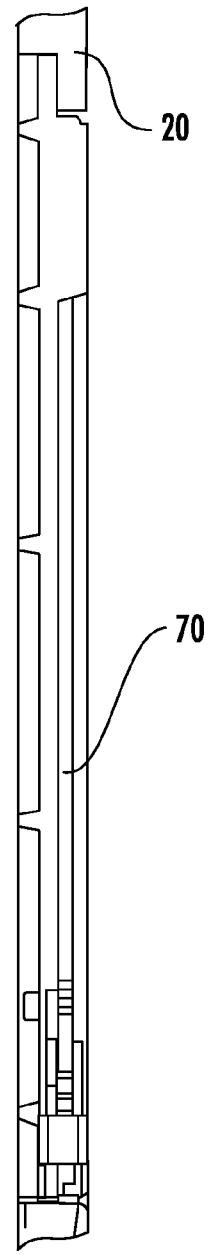
FIG. 34B is a detailed cross sectional view of the power connector disc in the wall mount.
Figures 35A, 35B:
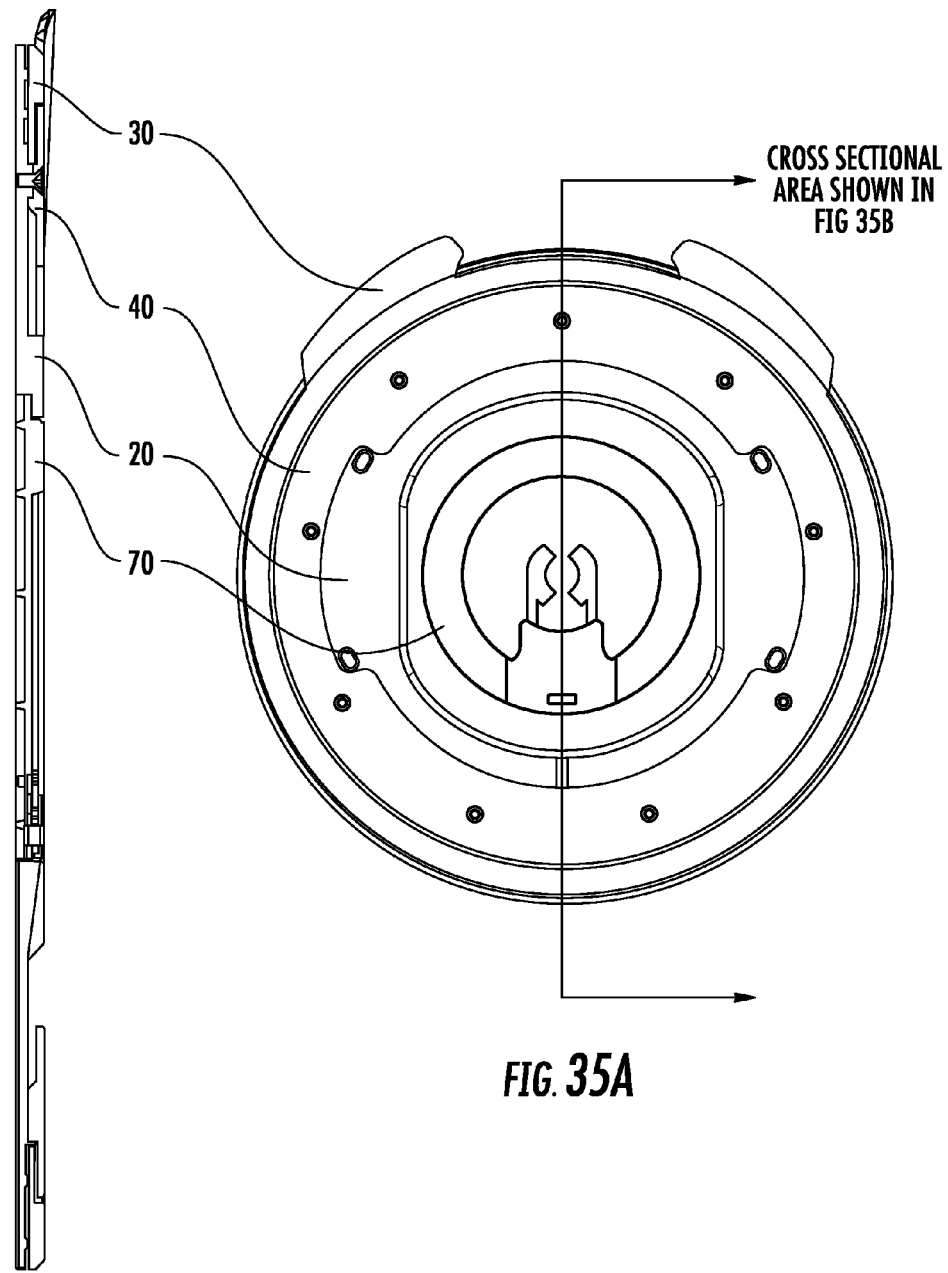
FIG. 35A is an oblique overall all view of the wall mount indicating the positioning of the cross sectional view illustrated in FIG. 35B.
FIG. 35B is a full cross sectional view of the wall mount and power connector disc.

The power disc 70 sits in the center of the wall mount 10 as seen in FIGS. 1, 34A, 35A, and 35B and provides electricity to the display device. A detailed view of the power disc inside of the wall plate in one embodiment of the invention is shown in FIG. 34B. The power disc is made up of five components: a main disc 71, two contact pads 72, wires 73, a strain relief 74, and a cover 75. The main disc 71 is circular in shape with raised arcs that create a recessed compartment in the center of the main disc, as seen in FIG. 27. These arcs enclose and protect the electrical contact pads 72 which supply power to the device 50 and are preferably in the center of the main disc 71. The main disc includes further protrusions that encircle the wires and strain relief and provide a foundation on which the cover piece 75 rests, creating a protected compartment where the wires 73 connect to the contact pads 72. It also preferably includes a second recess for the insulated wires. In some embodiments the main disc further includes orifices for connecting the cover piece 75 via corresponding stakes on the cover piece 76. The contact pads 72 are two metal plates, one positively charged and one negatively charged, that lay in recess on the face of the main disc as in FIG. 31 and are preferably secured thereto with an adhesive. They are shaped to carry electricity to the center of the main disc 71, preferably with arcs having a radius centered concentrically with the other components when assembled, which will accommodate for rotation of the display device's contact points as the device's orientation changes. The contact pads 72 may be made of any material that conducts electricity, although those that do so most efficiently and inexpensively, such as copper or aluminum, are preferred. They may be made from a sheet of metal having two holes positioned vertically near a lower edge as seen in FIG. 30A. The upper holes will provide a structure to anchor the contact pads to the main disc 71 while the lower holes will provide a connection point for the wires 73. FIG. 30B illustrates a sheet of metal that may then be cut to the preferred shape. Double sided tape is preferably secured to the back of the contact pads by peeling the backing of the tape. Wires 73 attached to the bottom of the contact pads preferably connect the pads to an electrical power source. The power source is in the form of electrical wire that is connected to the power disk by a connector (not shown) allowing for easy replacement of the electrical source. The wires 73 can be made of any conductive material. As seen in FIG. 28A the preferred embodiment uses standard two-wire cable. In the preferred embodiment, the wires of the two-wire cable are separated at the last 35 millimeters from the end using an Exacto-type knife. The wires are then stripped of insulation at the end 25 millimeters as seen in FIG. 28B. The wires 73 should be insulated where possible, as in FIG. 29A. Next, the strain relief 74 should be slipped over the end of the wires just past the point where the cable has been split. The preferred embodiment includes positive and negative markings on the strain relief which should align with the corresponding wires 73 as in FIG. 29A. Once the positive and negative contact pads 72 are identified as in FIG. 29B, the wires 73 may be passed through the lower holes in the ends of the contact pads and soldered into place. The lowest hole should be connected to wires 73 while the upper hole should be kept clear. The contact pads 72 should be secured flat on the face of the main disc via the strain relief. The contact pads are then placed on the main disc with the cable and strain relief as shown in FIG. 31. The insulated wires 73 should not pass beyond the recess of the main disc. The exposed wires must not contact each other. Once the assembly is well aligned, the wires 72 should be secured with a glue gun and a generous amount of hot glue as in FIG. 32A. The placement of the glue is highlighted in FIG. 32B. The glue will provide strain relief and keep the exposed wires separated and insulated from each other. Finally, a cover 75 with a series of stakes engages with the protrusions of the main disc 71 and encases the contact pads 72, wires 73, and strain relief 74 between the cover and the main disc 71. The cover is preferably positioned before the hot glue hardens and secured in place preferably by melting stakes protruding from the cover 76 into the holes of the main disc 71 as illustrated in FIG. 33B.

Figure 15:
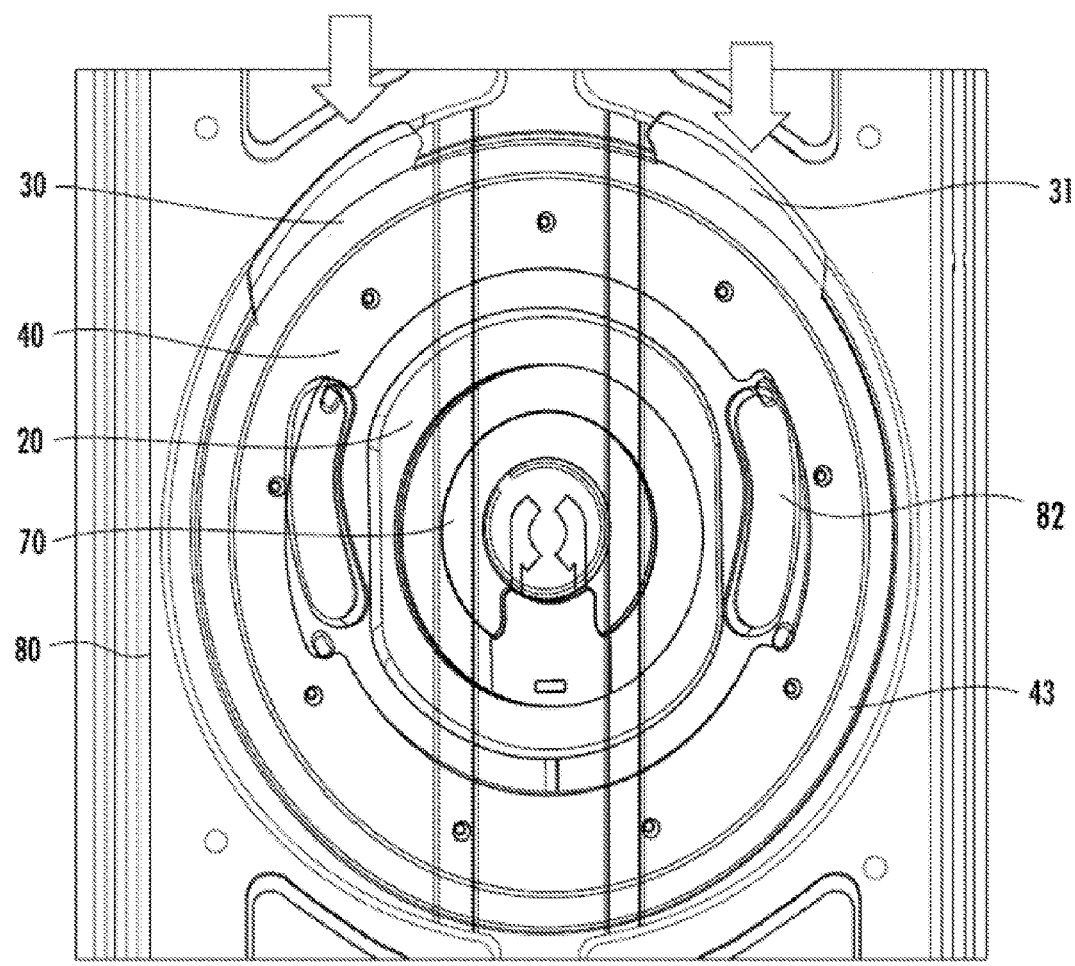
FIG. 15 illustrates a front view of the installation of the back plate on the wall mount. The display device is not shown and the back plate is transparent.

Preferably, the display device 50 includes a back cover 80 which connects the device to the wall mount 10. The back cover 80 is generally a steel plate with recesses, orifices, and protrusions which integrate the wall mount into its center. Specifically, the back cover 80 has slots 81 that interlock with the mounting horns 31 of the rotator ring 30. These slots 81 are positioned in a way that the mounting horns 31 are at the top most points of the wall mount 10 when the display device 50 is in the vertical position. The back cover 80 also has two raised flaps 82 that are positioned to interlock with the smaller diameter arcs 43 of the face plate. The knife edges 45 of arcs 43 will slide under the flaps 82. They are positioned so that one flap 82 is above the point of rotation and one flap 82 is below the point of rotation when the device is in the horizontal orientation to support the device in both directions. This design is illustrated in FIG. 15. Preferably, the slots and flaps are punched and stamped into sheet metal that forms the back cover 80. As the device 50 and back cover 80 rotate, the flaps 82 will be moved to the sides of the point of rotation and thus will not interlock with the face plate when the device is in the vertical orientation. This movement is shown in FIGS. 21-24 in which the wall plate is invisible.

Figure 16:
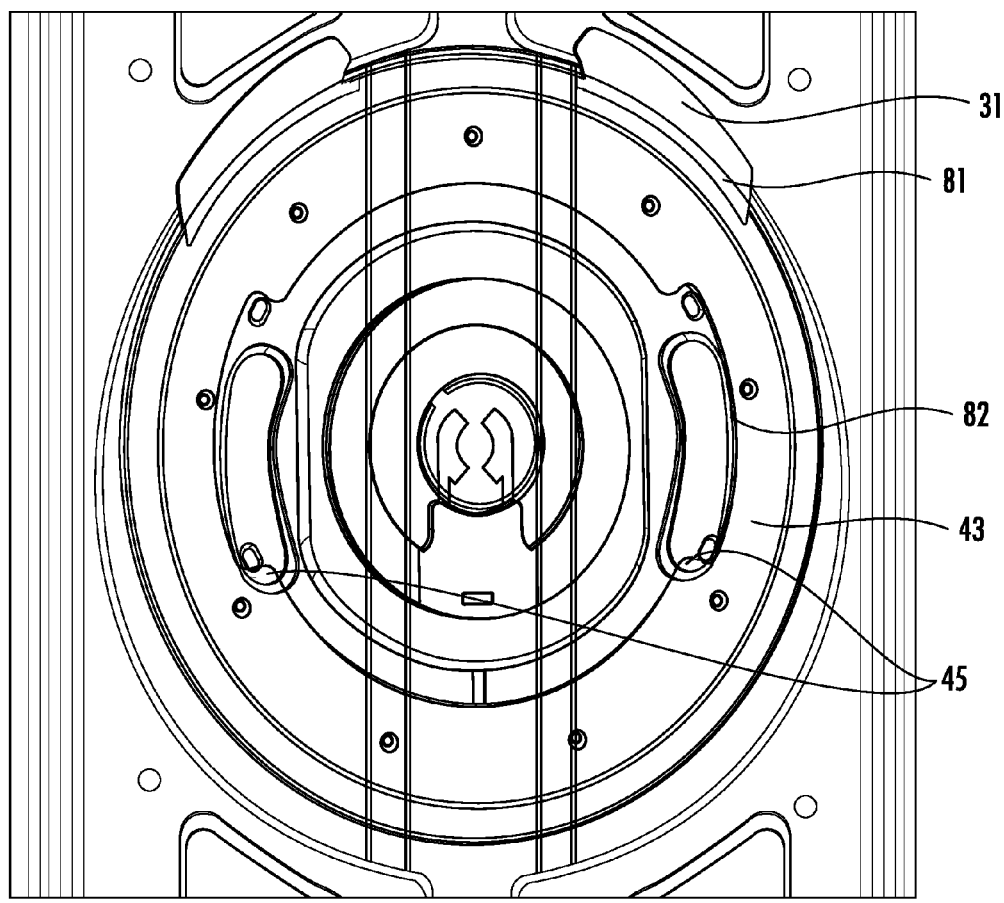
FIG. 16 shows a front view of the wall mount in the back plate. The display device is not shown and the back plate is transparent.
Figure 17:
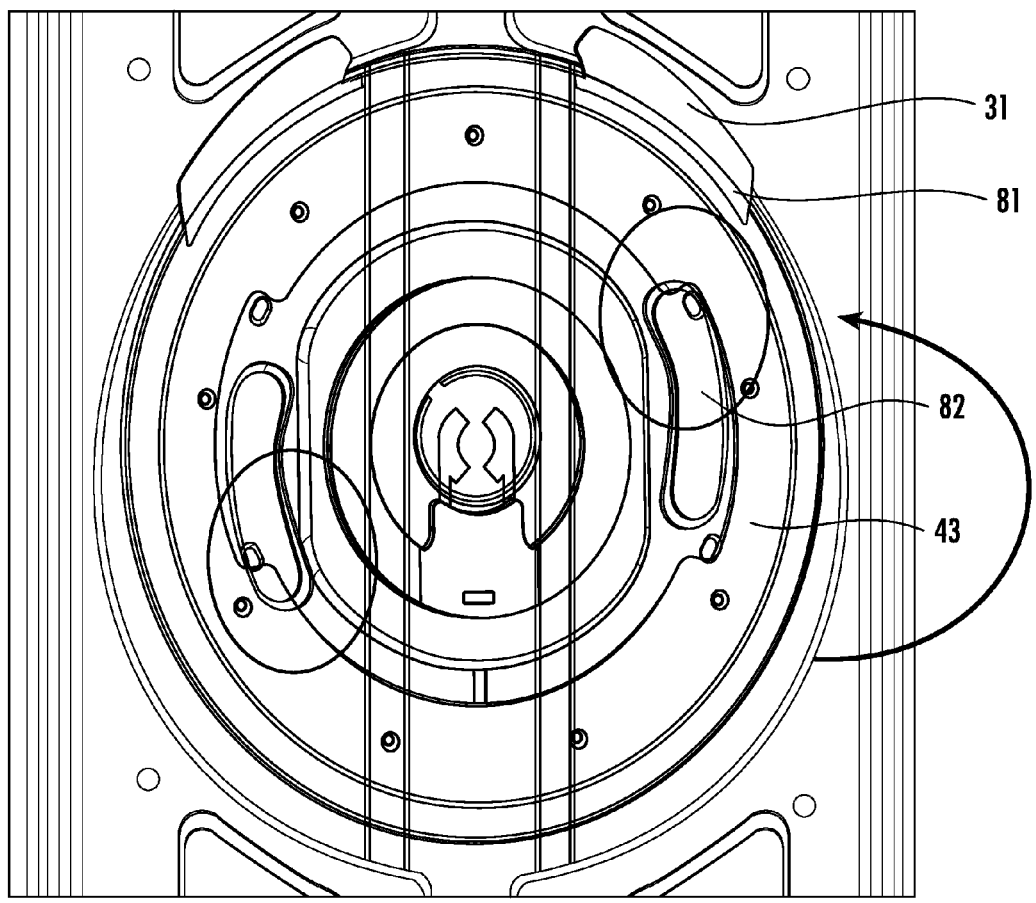
FIG. 17 illustrates the rotation of the back plate and rotator plate in the wall mount from a front view. The display device is not shown and the back plate is transparent.
Figure 18:
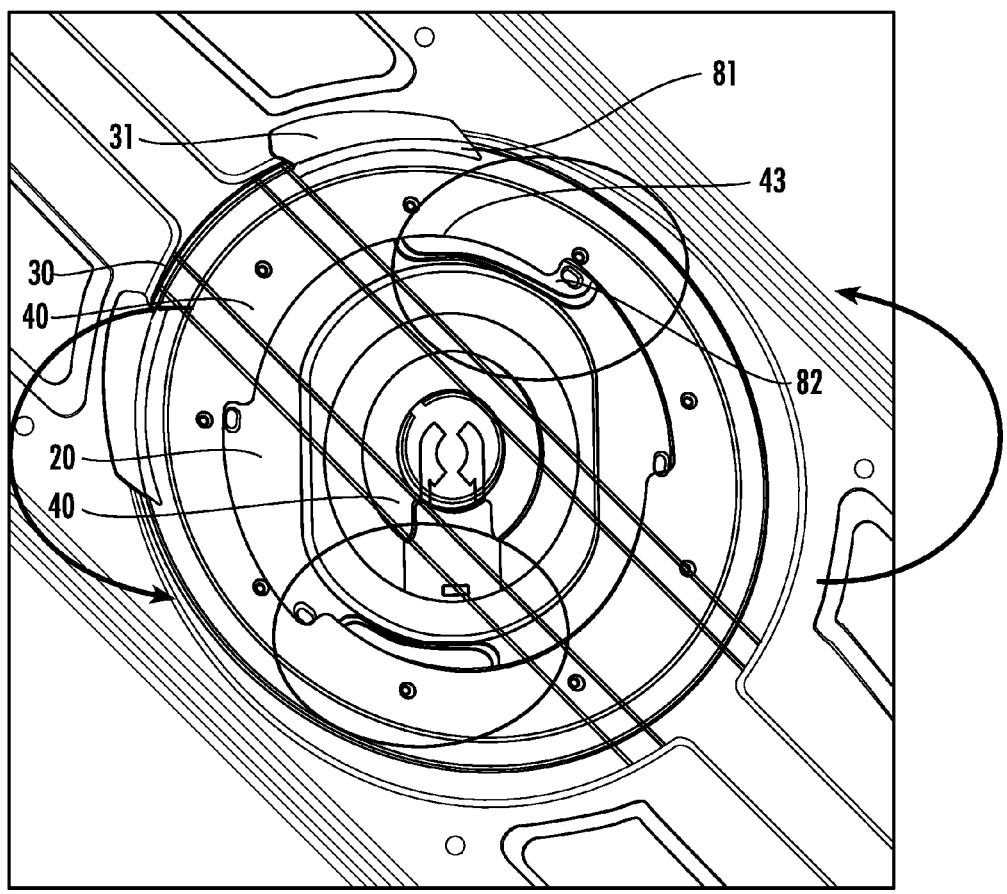
FIG. 18 illustrates further rotation of the back plate and rotator plate in the wall mount. The display device is not shown and the back plate is transparent.
Figure 19:
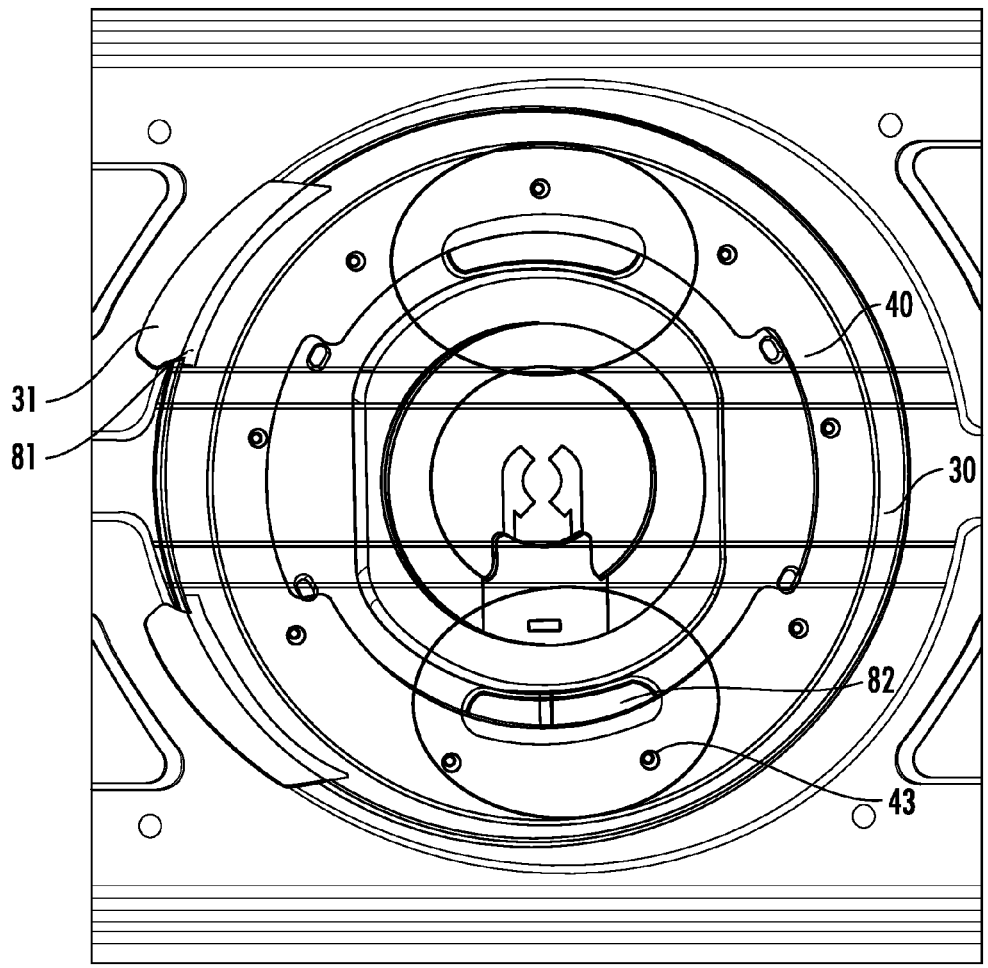
FIG. 19 illustrates further rotation of the back plate and rotator plate in the wall mount. The display device is not shown and the back plate is transparent.
Figure 20:
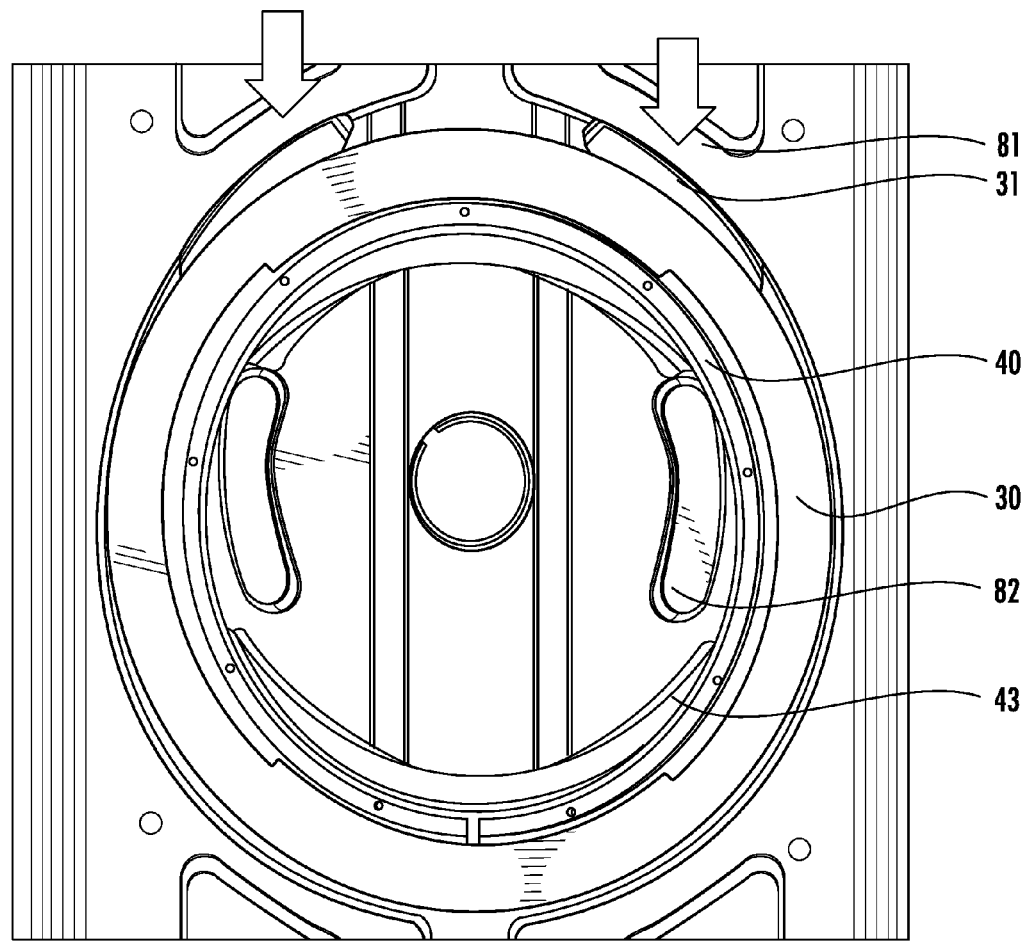
FIG. 20 shows a back view of the wall mount in the back plate. The wall plate and the power disc are not shown.
Figure 21:
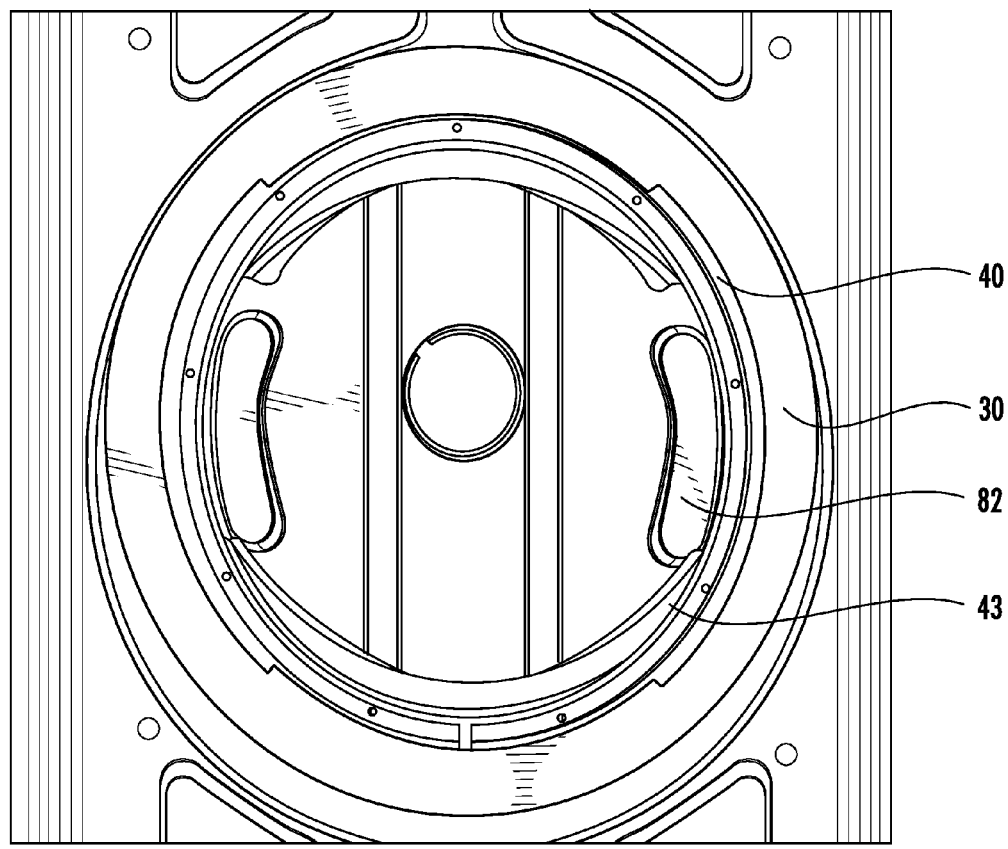
FIG. 21 shows the wall mount in position in the back plate. The wall plate is not shown.
Figure 22:
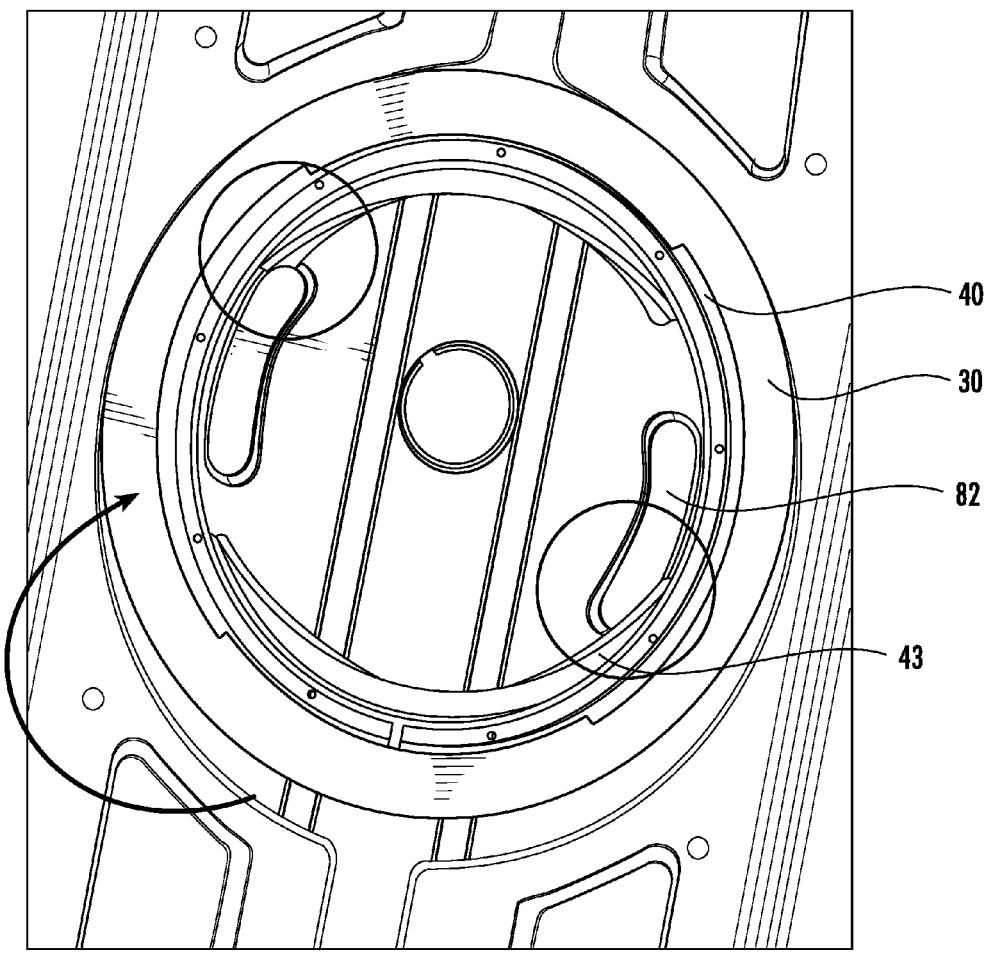
FIG. 22 illustrates the rotation of the back plate and rotator plate in the wall mount from a back view. The wall plate is not shown.
Figure 23:
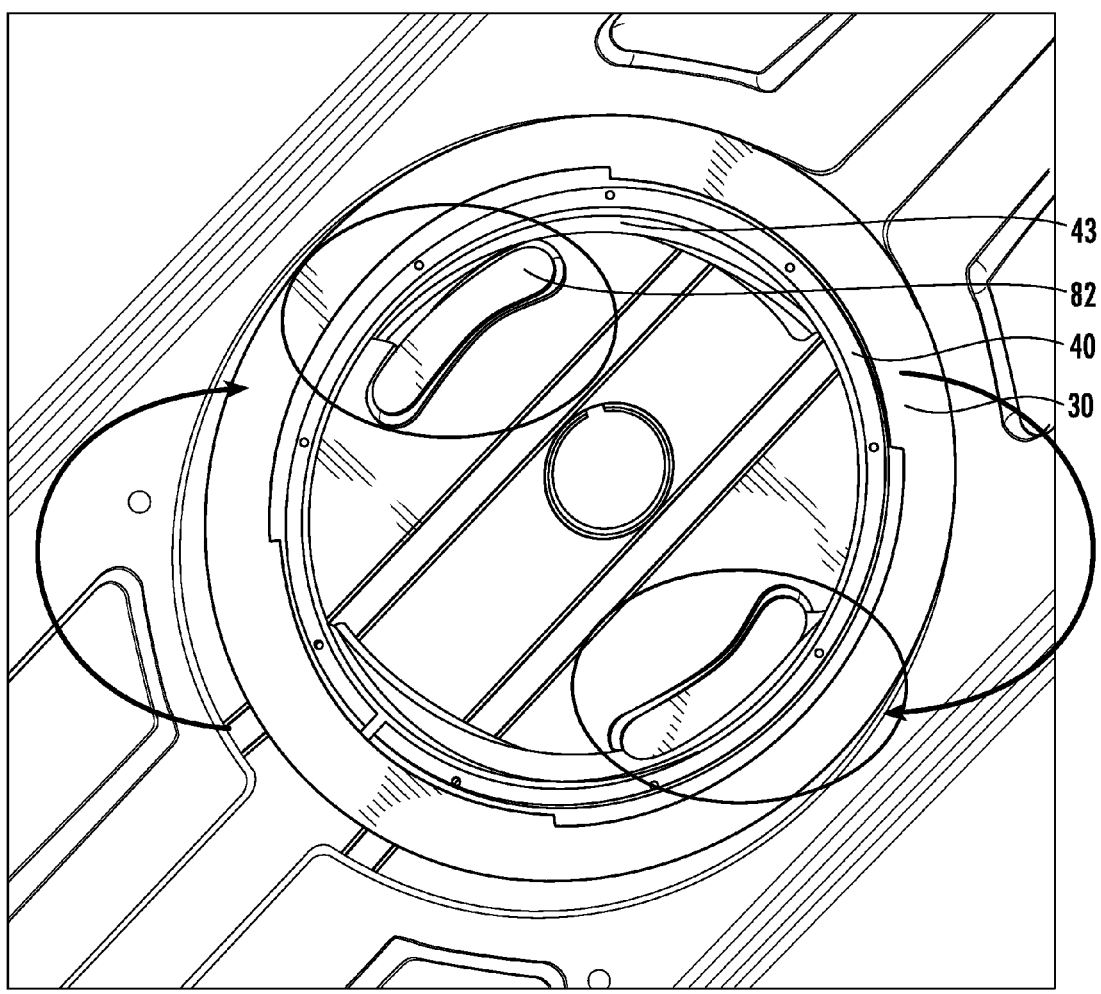
FIG. 23 illustrates further rotation of the back plate and rotator plate in the wall mount from a back view. The wall plate is not shown.

The device 50 is attached to the wall mount 10 in the vertical orientation by placing the device slightly above the wall mount. The user then lowers the device 50 onto the wall mount 10, where the mounting horns 31 will be captured by the corresponding slots 81 on the back cover as the device 50 slides downward. The lower blades 45 will also partially engage with the flaps 82 in this position as seen in FIG. 16. The connection between mounting horns 31 and the slots 81 will hold the device to the wall, as in FIG. 20. A user can then rotate the device 50, bringing it to a horizontal orientation, by simply pushing or pulling an edge or corner of the device. That action will move the device and rotate the back cover, sliding the raised flaps of the back cover along channels between the face plate 40 and the core of the wall plate 20 over the extended portions 43 and knife edges 45 of the face plate. Thus, in the horizontal orientation, the device 50 is supported by the flaps 82, locked into the face plate 40 above and below which secures the device on the wall via the raised flaps rather than only the mounting horns. Thus, the slots 81 are engaged when the invention is mounted in the vertical orientation and flaps 82 are engaged when the invention is rotated into horizontal orientation.

It will be understood by those of ordinary skill in the art that various changes may be made and equivalents may be substituted for elements without departing from the scope of the invention. In addition, many modifications may be made to adapt a particular feature or material to the teachings of the invention without departing from the scope thereof. Therefore, it is intended that the invention not be limited to the particular embodiments disclosed, but that the invention will include all embodiments falling within the scope of the claims.

What is claimed is:

1. A system for pivotally mounting an electronic device to a wall comprising:
    a power connector disc having a pair of contact pads;
    a wall plate configured to mount to the wall having a central opening and having at least one mounting slot and at least one protruding rotation limiting tab;
    a rotator plate configured to coaxially engage said wall plate having at least one mounting horn extending in an upward direction from the circumference and a circular central opening having at least one inwardly projecting rotation tab;
    a face plate configured to coaxially engage said rotator plate and said wall plate, and fixed to the wall plate to enclose the rotator plate between the wall plate and the face plate, and having a circular central opening defined by an inner circular edge and at least one strip along the said circular inner edge extending into the interior of the circular central opening of the face plate;
    a back cover configured to mount to the electronic device having a pair of power contact points positioned to make contact with said pair of contact pads, at least one horn slot sized to receive to said mounting horn and at least one flap sized to receive said at least one strip;
    wherein said strips are positioned into said flaps in a first position and said strips are positioned out of said flaps in a second position; and
    wherein rotation of said rotator plate with respect to said wall plate and said face plate is defined by the interaction of the at least one rotation limiting tab with the at least one rotation tab.

2. A system as described in claim 1 wherein said at least one horn slot receives said at least one mounting horn from below when said electronic device is in the vertical position.

3. A system as described in claim 1 wherein said first position is a horizontal position and said second position is a vertical position.

4. A system as described in claim 1 wherein the thickness of the said wall plate, said rotator plate, and said face plate collectively is approximately 8 millimeters.

5. A system as described in claim 4 wherein the thickness of the said wall plate, said rotator plate, and said face plate collectively does not exceed 7.8 millimeters.

6. A system as described in claim 1 wherein said face plate further includes at least one mounting slot corresponding with said at least one mounting slot in said wall plate.

7. A system as described in claim 1 wherein said at least one strip on said face plate has a knife edge.

8. A system as described in claim 1 wherein said wall plate further includes a channel for a power cable.

9. A system as described in claim 1 wherein said contact pads are arcuate.

10. A system as described in claim 1 wherein said contact pads are connected to a connector which is removably attached to a power source.

11. A system as described in claim 1 wherein said contact pads provide continuous power to said power contact points during said rotation.

12. A system as described in claim 1 wherein said wall plate is configured to mount to the wall by screws.

13. A system as described in claim 1 wherein said wall plate is configured to mount to the wall by double sided adhesive tape.

14. A system as described in claim 1 wherein said electronic device is mounted no more than 2.5 mm away from said wall.

15. A method for pivotally mounting an electronic device to a wall comprising the steps of:
    providing a power connector disc having a pair of contact pads;
    providing a wall plate configured to mount to the wall having a central opening and having at least one mounting slot and at least one protruding rotation limiting tab;
    providing a rotator plate configured to coaxially engage said wall plate having at least one mounting horn extending in an upward direction from the circumference and a circular central opening having at least one inwardly projecting rotation tab;
    providing a face plate configured to coaxially engage said wall plate and said rotator plate, and fixed to the wall plate to enclose the rotator plate between the wall plate and the face plate, and having a circular central opening defined by an inner circular edge and at least one strip along the said circular inner edge extending into the interior of the circular central opening of the face plate;

providing a back cover configured to mount to the said electronic device having a pair of power contact points in contact with said pair of contact pads, at least one horn slot sized to receive said at least one mounting horn, and at least one flap sized to receive said at least one strip;

mounting said wall plate, said rotator plate, and said face to a wall;

positioning the said back cover connected to the electronic device above the said rotator plate and lowering said back cover connected to the electronic device onto the rotator plate such that the said at least one horn slot lays on top of said at least one mounting horn;

wherein said strips are positioned into said flaps in a first position and said strips are positioned out of the said flaps when said device is in a second position; and wherein rotation of said rotator plate with respect to said wall plate and said face plate is defined by the interaction of the at least one rotation limiting tab with the at least one rotation tab.

16. A method as described in claim 15 wherein said at least one horn slot receives said at least one mounting horn from below when said electronic device is in the vertical position.

17. A method as described in claim 15 wherein said first position is a horizontal position and said second position is a vertical position.

18. A method as described in claim 15 wherein the thickness of the said wall plate, said rotator plate, and said face plate collectively is approximately 8 millimeters.

19. A method as described in claim 18 wherein the thickness of the said wall plate, said rotator plate, and said face plate collectively does not exceed 7.8 millimeters.

20. A method as described in claim 15 wherein said face plate further includes at least one mounting slot corresponding with said at least one mounting slot in said wall plate.

21. A method as described in claim 15 wherein said at least one strip on said face plate has a knife edge.

22. A method as described in claim 15 wherein said wall plate further includes a channel for a power cable.

23. A method as described in claim 15 wherein said contact pads are arcuate.

24. A method as described in claim 15 wherein said contact pads are connected to a connector which is removably attached to a power source.

25. A method as described in claim 15 wherein said contact pads provide continuous power to said power contact points during said rotation.

26. A method as described in claim 15 wherein said wall plate is configured to mount to the wall by screws.

27. A method as described in claim 15 wherein said wall plate is configured to mount to the wall by double sided adhesive tape.

28. A method as described in claim 15 wherein said electronic device is mounted no more than 2.5 mm away from said wall.

29. A system for pivotally mounting a display device to a wall comprising:

the display device having a back cover;

a power connector disc having a pair of contact pads;

a wall plate configured to mount to the wall having a central opening having at least one mounting slot and at least one protruding rotation limiting tab;

a rotator plate configured to coaxially engage said wall plate and having at least one mounting horn extending in an upward direction from the circumference and a circular central opening having at least one inwardly projecting rotation tab;

a face plate configured to coaxially engage said rotator plate and said wall plate, and fixed to the wall plate to enclose the rotator plate between the wall plate and the face plate, and having a circular central opening defined by an inner circular edge and at least one strip along the said inner circular edge extending into the interior of the circular central opening of the face plate;

the back cover configured to mount to the display device having a pair of power contact points in contact with said pair of contact pads, at least one horn slot sized to receive to said mounting horn and at least one flap sized to receive said at least one strip;

wherein said strips are positioned into said flaps in a first position and said strips are positioned out of said flaps in a second position; and wherein rotation of said rotator plate with respect to said wall plate and said face plate is defined by the interaction of the at least one rotation limiting tab with the at least one rotation tab.

30. A system as described in claim 29 wherein said at least one horn slot receives said at least one mounting horn from below when said display device is in the vertical position.

31. A system as described in claim 29 wherein said first position is a horizontal position and said second position is a vertical position.

32. A system as described in claim 29 wherein the thickness of the said wall plate, said rotator plate, and said face plate collectively is approximately 8 millimeters.

33. A system as described in claim 32 wherein the thickness of the said wall plate, said rotator plate, and said face plate collectively does not exceed 7.8 millimeters.

34. A system as described in claim 29 wherein said face plate further includes at least one mounting slot corresponding with said at least one mounting slot in said wall plate.

35. A system as described in claim 29 wherein said at least one strip on said face plate has a knife edge.

36. A system as described in claim 29 wherein said wall plate further includes a channel for a power cable.

37. A system as described in claim 29 wherein said contact pads are arcuate.

38. A system as described in claim 29 wherein said contact pads are connected to a connector which is removably attached to a power source.

39. A system as described in claim 29 wherein said contact pads provide continuous power to said power contact points during said rotation.

40. A system as described in claim 29 wherein said wall plate is configured to mount to the wall by screws.

41. A system as described in claim 29 wherein said wall plate is configured to mount to the wall by double sided adhesive tape.

42. A system as described in claim 29 wherein said electronic device is mounted no more than 2.5 mm away from said wall.

43. A method for pivotally mounting a display device to a wall comprising the steps of:

providing a power connector disc having a pair of contact pads;

providing a wall plate configured to mount to the wall having a central opening and having at least one mounting slot and at least one protruding rotation limiting tab;

providing a rotator plate configured to coaxially engage said wall plate having at least one mounting horn extending in an upward direction from the circumference and a circular central opening having at least one inwardly projecting rotation tab;

providing a face plate configured to coaxially engage said wall plate and said rotator plate, and fixed to the wall plate to enclose the rotator plate between the wall plate and the face plate, and having a circular central opening defined by an inner circular edge and at least one strip along the said inner circular edge extending into the interior of the circular central opening of the face plate;

providing a back cover attached to the back of the display device configured to mount to the said display device having a pair of power contact points in contact with said pair of contact pads, at least one horn slot sized to receive said at least one mounting horn, and at least one flap sized to receive said at least one strip;

mounting said wall plate, said rotator plate, and said face to a wall;

positioning the said back cover connected to the display device above the said rotator plate and lowering said back cover connected to the display device onto the rotator plate such that the said at least one horn slot lays on top of said at least one mounting horn;

wherein said strips are positioned into said flaps in a first position and said strips are positioned out of the said flaps when said device is in a second position; and wherein rotation of said rotator plate with respect to said wall plate and said face plate is defined by the interaction of the at least one rotation limiting tab with the at least one rotation tab.

44. A method as described in claim 43 wherein said at least one horn slot receives said at least one mounting horn from below when said display device is in the vertical position.

45. A method as described in claim 43 wherein said first position is a horizontal position and said second position is a vertical position.

46. A method as described in claim 43 wherein the thickness of the said wall plate, said rotator plate, and said face plate collectively is approximately 8 millimeters.

47. A method as described in claim 46 wherein the thickness of the said wall plate, said rotator plate, and said face plate collectively does not exceed 7.8 millimeters.

48. A method as described in claim 43 wherein said face plate further includes at least one mounting slot positioned to corresponding with said at least one mounting slot in said wall plate.

49. A method as described in claim 43 wherein said at least one strip on said face plate has a knife edge.

50. A method as described in claim 43 wherein said wall plate further includes a channel for a power cable.

51. A method as described in claim 43 wherein said contact pads are arcuate.

52. A method as described in claim 43 wherein said contact pads provide continuous power to said power contact points during said rotation.

53. A method as described in claim 43 wherein said wall plate is configured to mount to the wall by screws.

54. A method as described in claim 43 wherein said wall plate is configured to mount to the wall by double sided adhesive tape.

55. A method as described in claim 43 wherein said electronic device is mounted no more than 2.5 mm away from said wall.

* * * * *

UNITED STATES PATENT AND TRADEMARK OFFICE
CERTIFICATE OF CORRECTION

PATENT NO. : 9,782,003 B2
APPLICATION NO. : 14/970097
DATED : October 10, 2017
INVENTOR(S) : Marc Trachtenberg and Francois Gariepy Page 1 of 1

It is certified that error appears in the above-identified patent and that said Letters Patent is hereby corrected as shown below:

On the Title Page

At Item (73), please replace "Viden Inc." with "Videri Inc."

Signed and Sealed this
Fifth Day of December, 2017

Joseph Matal
*Performing the Functions and Duties of the*
*Under Secretary of Commerce for Intellectual Property and*
*Director of the United States Patent and Trademark Office*